US012647773B2

(12) United States Patent
Shrivastava et al.

(10) Patent No.: US 12,647,773 B2
(45) Date of Patent: Jun. 2, 2026

(54) GAP CONFIGURATION FOR UE COMPRISING A PLURALITY OF SIMS IN WIRELESS NETWORK

(71) Applicant: Samsung Electronics Co., Ltd., Gyeonggi-do (KR)

(72) Inventors: Vinay Kumar Shrivastava, Bangalore (IN); Fasil Abdul Latheef, Bangalore (IN)

(73) Assignee: Samsung Electronics Co., Ltd (KR)

( * ) Notice: Subject to any disclaimer, the term of this patent is extended or adjusted under 35 U.S.C. 154(b) by 361 days.

(21) Appl. No.: 18/032,945

(22) PCT Filed: Oct. 22, 2021

(86) PCT No.: PCT/KR2021/014946

§ 371 (c)(1),
(2) Date: Apr. 20, 2023

(87) PCT Pub. No.: WO2022/086285

PCT Pub. Date: Apr. 28, 2022

(65) Prior Publication Data

US 2023/0396984 A1       Dec. 7, 2023

(30) Foreign Application Priority Data

Oct. 22, 2020    (IN) .............................. 202041046103
Sep. 28, 2021    (IN) .............................. 202041046103

(51) Int. Cl.
H04W 76/15          (2018.01)
H04W 8/18           (2009.01)
(Continued)

(52) U.S. Cl.
CPC ........... H04W 8/186 (2013.01); H04W 76/20 (2018.02)

(58) Field of Classification Search
CPC . H04W 8/186; H04W 76/20; H04W 36/0088; H04W 8/183; H04W 60/005;
(Continued)

(56) References Cited

U.S. PATENT DOCUMENTS

2015/0003435 A1    1/2015  Horn et al.
2018/0007729 A1    1/2018  Koshta et al.
(Continued)

FOREIGN PATENT DOCUMENTS

KR    10-2018-0066270      6/2018
WO    WO 2016/126327       8/2016
WO    WO 2020/076331       4/2020

OTHER PUBLICATIONS

PCT/ISA/210 Search Report issued on PCT/KR2021/014946, dated Jan. 4, 2022, pp. 3.
(Continued)

*Primary Examiner* — Ayman A Abaza
*Assistant Examiner* — Tracy L Williams
(74) *Attorney, Agent, or Firm* — The Farrell Law Firm, P.C.

(57) ABSTRACT

Embodiments herein provide a method for gap scheduling for a UE 100 comprising a plurality of SIMs 150 in a wireless network 1000 by the UE 100. The method includes sending a request for the gap configuration to a first network operator device 200a associated with a first SIM 150a from the plurality of SIMs 150. Further, the method includes receiving the gap configuration corresponding to the gap from the first network operator device 200a. Further, the method includes activating the gap on the first SIM 150a based on the gap configuration. Further, the method includes switching to the second network operator device 200b

(Continued)

associated with the second SIM 150b-150n for service reception on the second SIM 150b-150n during the activated gap on the first SIM 150a.

13 Claims, 16 Drawing Sheets

(51) Int. Cl.

| | |
|---|---|
| *H04W 8/24* | (2009.01) |
| *H04W 36/18* | (2009.01) |
| *H04W 76/20* | (2018.01) |
| *H04W 76/27* | (2018.01) |

(58) Field of Classification Search
CPC ..... H04W 76/15; H04W 76/27; H04W 88/06; H04W 76/25; H04W 8/24; H04W 36/18; Y02D 30/70
USPC .......................................................... 370/329
See application file for complete search history.

(56) References Cited

U.S. PATENT DOCUMENTS

| | | | |
|---|---|---|---|
| 2021/0051757 A1* | 2/2021 | Tseng ...................... | H04W 8/08 |
| 2022/0072175 A1* | 3/2022 | Lovlekar ................... | A61L 2/22 |
| 2022/0256328 A1* | 8/2022 | Xie ......................... | H04W 76/28 |
| 2023/0047213 A1* | 2/2023 | Chen .................... | H04W 60/005 |
| 2023/0156544 A1* | 5/2023 | Wu ................... | H04W 36/0094 |
| | | | 370/331 |
| 2023/0345332 A1* | 10/2023 | Wang ................... | H04W 36/144 |
| 2023/0379776 A1* | 11/2023 | Eklöf ............... | H04W 36/0005 |

OTHER PUBLICATIONS

PCT/ISA/237 Written Opinion issued on PCT/KR2021/014946, dated Jan. 4, 2022, pp. 4.
Indian Examination Report dated Jun. 9, 2022 issued in counterpart application IN 202041046103, pp. 6.
China Telecom, "Discussion on various scenarios of UE switching from network for activities on another network", 3GPP TSG-RAN WG2 Meeting #112-e R2-2008831 Electronic, Oct. 2-13, 2020, pp. 6.

* cited by examiner

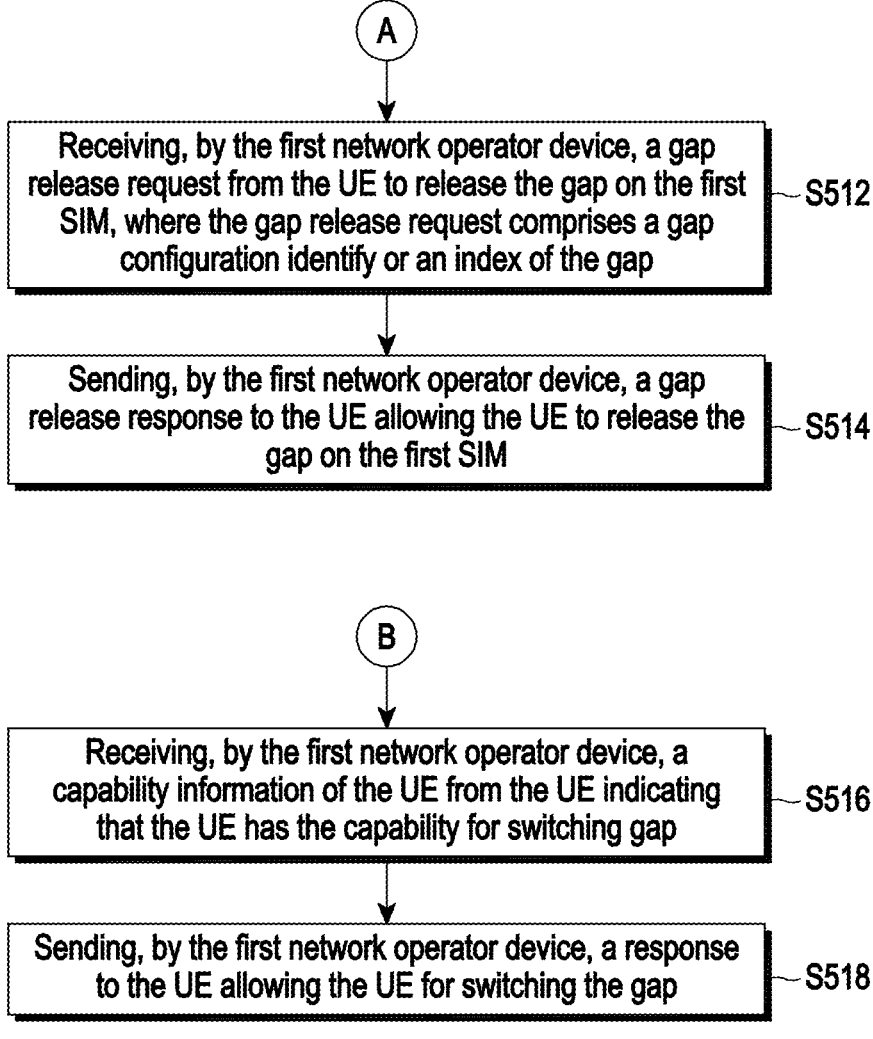

A

Receiving, by the first network operator device, a gap release request from the UE to release the gap on the first SIM, where the gap release request comprises a gap configuration identify or an index of the gap ~S512

Sending, by the first network operator device, a gap release response to the UE allowing the UE to release the gap on the first SIM ~S514

B

Receiving, by the first network operator device, a capability information of the UE from the UE indicating that the UE has the capability for switching gap ~S516

Sending, by the first network operator device, a response to the UE allowing the UE for switching the gap ~S518

FIG.5B

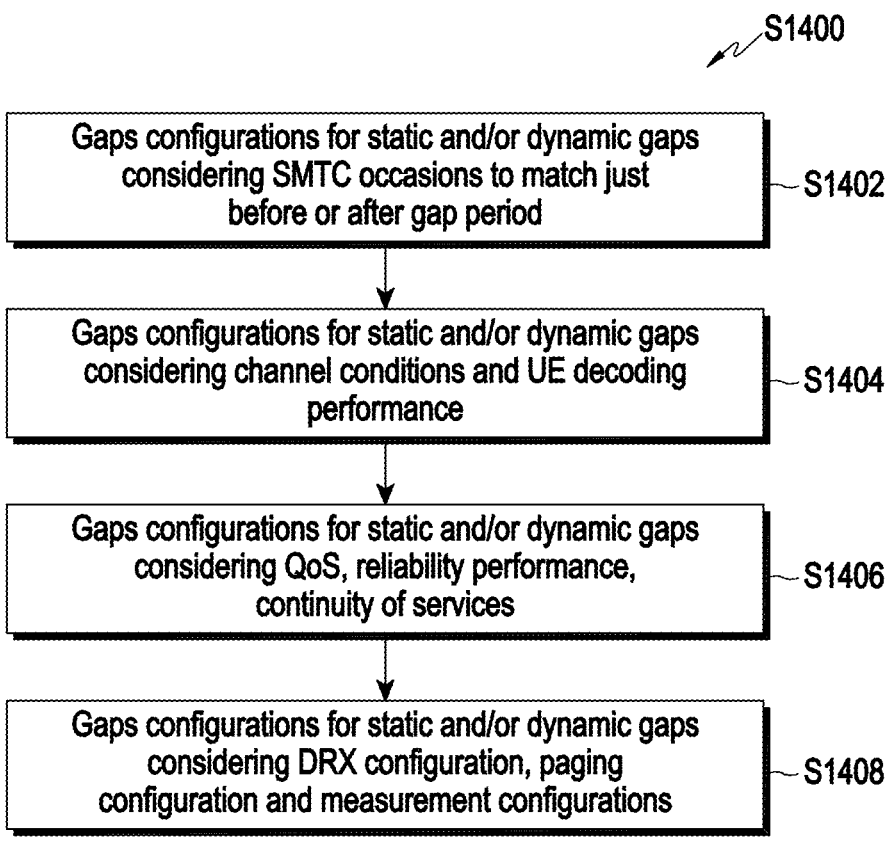

S1400

Gaps configurations for static and/or dynamic gaps considering SMTC occasions to match just before or after gap period — S1402

Gaps configurations for static and/or dynamic gaps considering channel conditions and UE decoding performance — S1404

Gaps configurations for static and/or dynamic gaps considering QoS, reliability performance, continuity of services — S1406

Gaps configurations for static and/or dynamic gaps considering DRX configuration, paging configuration and measurement configurations — S1408

FIG.14

GAP CONFIGURATION FOR UE COMPRISING A PLURALITY OF SIMS IN WIRELESS NETWORK

CROSS-REFERENCE TO RELATED APPLICATIONS

This application is a U.S. National Phase Entry of PCT International Application No. PCT/KR2021/014946, which was filed on Oct. 22, 2021, and claims priority to Indian Provisional Patent Application No. 202041046103 and Indian Patent Application number 202041046103, which were filed in the Indian Intellectual Property Office on Oct. 22, 2020, and Sep. 28, 2021, respectively, the entire disclosure of each of which is incorporated herein by reference.

TECHNICAL FIELD

The present disclosure relates to a wireless network, and more specifically related to a method and a system for gap configuration for a User Equipment (UE) including Multi-Subscriber Identity Modules (SIMs) in the wireless network.

BACKGROUND ART

Due to popularity of Multi-SIM (MUSIM) devices that host more than one SIM to have a facility to connect to two or more different networks in order to avail different data plans, have user profiles like home and office, increased connectivity/reliability with multiple connections etc. In order to save on the cost, a radio frequency (RF) circuitry used by a UE is common for multiple SIMs. That implies, multiple SIMs need to arbitrate and share the common RF resource among themselves to perform their activities and/or avail services. Effectively, only one SIM and its associated protocol stack can be served. Meanwhile, all other SIMs and their associated protocol stacks will be waiting for the RF resource to be available for them. One or more of the multiple SIMs can be engaged in paging reception, system information block (SIB) acquisition, measurements, data or voice call, Multicast Broadcast Service (MBS) reception, emergency call, access stratum (AS) signaling, Non-access stratum (NAS) signaling and so on. Some of the operations are periodic like paging, measurements and some are aperiodic and/or un-deterministic like signaling.

Further, duration required to complete an operation may also be fixed or unpredictable. In order to share the resources among multiple SIMs when the SIMs are engaged in different activities, there is a need for a method which creates gaps during the activities of one SIM and make RF resource avail to other SIM for the gap duration. Further, as mentioned due to activities across multiple SIMs have different priorities, periodicities or unpredictable occurrences, it becomes a challenging task. Without an efficient approach, the operation of MUSIM UE as well as network operation will be power- and resource-inefficient.

FIG. 1 is a sequence flow diagram illustrating that a UE 100 takes autonomous gaps and performs operation on a second network operator device 200b based on paging/SIB reception and measurements, according to prior art. At S102, the UE 100 is connected to a first network operator device 200a and receives a service from the first network operator device 200a. At S104, the UE 100 takes autonomous gaps and performs operation on the second network operator device 200b based on paging/SIB reception, measurements. This results in loss of service packets on the first network operator device 200a. At S106, the UE 100 resumes service on the the first network operator device 200a.

Thus, it is desired to address the above mentioned disadvantages or other shortcomings or at least provide a useful alternative.

DISCLOSURE OF INVENTION

Technical Problem

The principal object of the embodiments herein is to provide a method and a system for gap configuration for a UE including a plurality of SIMs in a wireless network (e.g., 5G network, etc.,).

Another object of the embodiments herein is to save network resources, improve UE performance, prevent loss of data and increase reliability with coordinated gap and network switching operation.

Another object of the embodiments herein is to ensure that a service performance is maintained at best possible level for each of the SIMs in consideration to the kind of activities or services being availed on each SIM/network.

Another object of the embodiments herein is to prepare a request for a gap configuration based on paging configuration.

Another object of the embodiments herein is to prepare the request for the gap configuration based on a measurement configuration.

Another object of the embodiments herein is to prepare a request for the gap configuration based on a Discontinuous Reception (DRX) configuration of one or more second SIM.

Another object of the embodiments herein is to send the prepared request for the gap configuration to a first network operator device.

Another object of the embodiments herein is to receive the gap configuration from a first network operator device to perform activities on one or more second SIM.

Another object of the embodiments herein is to send a gap activation request to the first network operator device allowing an activation of the gap based on the gap configuration.

Another object of the embodiments herein is to receive a gap activation response from the first network operator device allowing the activation of the gap based on the gap configuration.

Another object of the embodiments herein is to activate the gap on the first SIM based on the gap configuration Another object of the embodiments herein is to switch to network operator device associated with the second SIM for service reception on the second SIM during the activated gap on the first SIM.

Solution to Problem

Accordingly, the embodiment herein is to provide a method for gap configuration for a UE comprising a plurality of SIMs in a wireless network. The method includes sending, by the UE, a request for at least one gap configuration to a first network operator device associated with a first SIM from the plurality of SIMs. The UE is in connected mode with the first SIM and is in an idle mode or an inactive mode with at least one second SIM of the plurality of SIMs. Further, the method includes receiving, by the UE, at least one gap configuration corresponding to at least one gap from the first network operator device. Further, the method includes activating, by the UE, the at least one gap on the first SIM based on the at least one gap configuration. Further, the method includes switching, by the UE, to at least one second network operator device associated with the at least one second SIM for service reception on the second SIM during the at least one activated gap on the first SIM.

In an embodiment, the method further includes sending, by the UE, a gap request to the first network operator device to configure the at least one gap on the first SIM. The gap request comprises at least one of a gap configuration identity or an index, gap-offset (start time for each period and is mapped to the timings mapped to at least one second network operator device), periodicity (repetition pattern), gap duration of the at least one gap. Additionally, the UE may include the purpose or cause for the gap and/or preferred RRC state the UE want to be in (e.g. RRC connected state, leaving RRC connection and/or RRC Idle state or RRC Inactive state). If aperiodic gap is requested, then periodicity (repetition pattern) may be absent. Further, gap-offset (start time e.g. starting System Frame Number (SFN) and subframe) is mapped to the timings mapped to at least one second network operator device. Further, the method includes receiving, by the UE, a gap configuration from the first network operator device allowing the UE to configure the at least one gap on the first SIM. The gap request is sent by UE to the first network operator through RRC signaling e.g. UE assistance information message. In an example, the gap request message can include request for N periodic gaps and M aperiodic gaps.

In an embodiment, the method further includes sending, by the UE, a gap release request to the first network operator device to release the at least one gap on the first SIM. The gap release request comprises a gap configuration identity or an index of the at least one gap. Further, the method includes receiving, by the UE, a gap release response from the first network operator device allowing the UE to release the at least one gap on the first SIM.

In an embodiment, the gap release request is sent in one of a RRC message e.g. UE assistance information message or a MAC CE.

In an embodiment, the same message (e.g. UE assistance information message) can carry setup/modify (gap request) or release of the gaps. That is, same message can carry gap set up/modify for at least one of periodic and/or aperiodic gaps and release of at least one of periodic and/or aperiodic gaps in the same message at same time. In an example, the gap message can include request for N periodic gaps and M aperiodic gaps as well as release for N periodic gaps and M aperiodic gaps. The maximum new gaps that can be requested can be N+M along with maximum existing gaps that can be released can be N+M.

In an embodiment, the method further includes sending, by the UE, a capability information of the UE to the first network operator device indicating that the UE has the capability for switching gap. Further, the method includes receiving, by the UE, a response from the first network operator device allowing the UE for switching gaps. The capability information is sent by UE in a RRC signaling message e.g. UE capability information message or UE assistance information message.

In an embodiment, the network configures UE with "OtherConfig" of RRC reconfiguration message to provide MUSIM assistance though UE assistance information message. This configuration can be in accordance to the capability information provided by the UE. When the UE receives the configuration for "OtherConfig" from RRC reconfiguration message, UE pursues providing MUSIM assistance through UE assistance information message e.g. for at least one of gap request, gap release and gap activation request.

In an embodiment, activating, by the UE, the at least one gap on the first SIM based on the at least one gap configuration includes sending, by the UE, a MAC CE to activate the at least one gap to the first network operator device, and receiving, by the UE, a gap indication from the first network operator device allowing the activation of the at least one gap based on the at least one gap configuration.

In an embodiment, the MAC CE includes an index of the gap and at least one of when the at least one gap is periodic a gap offset, and when the at least one gap is dynamic, a gap offset or activation time for the at least one gap, a duration of the at least one gap.

In an embodiment, activating, by the UE, the at least one gap on the first SIM based on the at least one gap configuration includes sending, by the UE, a gap activation request to activate the at least one gap to the first network operator device, and receiving, by the UE, a gap activation response from the first network operator device allowing the activation of the at least one gap based on the at least one gap configuration. The UE sends the gap activation request with a RRC signaling message e.g. UE assistance information message.

In an embodiment, the request for the at least one gap configuration comprises at least one of a list of static or periodic gaps and a list of dynamic or aperiodic gaps, wherein the list of static or periodic gaps has a known periodicity (repetition pattern), a gap-offset indicating a start time of the gap for each period and is mapped to the timings mapped to at least one second network operator device, and a duration of the gap, and wherein the list of dynamic or aperiodic gaps has a gap-offset indicating a start time of the gap e.g. starting System Frame Number (SFN) and subframe is mapped to the timings mapped to at least one second network operator device and a duration of the gap is known or not known a priory.

In an embodiment, the method further includes performing, by the UE, paging on the at least one second network operator device during the at least one gap. Further, the method includes sending, by the UE, a busy or not busy indication to the at least one second network operator device. Further, the method includes stopping, by the network, the paging on the at least one second network operator device in response to sending the busy indication.

In an embodiment, sending, by the UE, a request for the at least one gap configuration to the first network operator device associated with the first SIM from the plurality of SIMs includes preparing, by the UE, the request for the at least one gap configuration based on at least one of a paging configuration, a measurement configuration, System Information Block (SIB) scheduling configuration and a DRX configuration of the at least on second SIM, and sending, by the UE, the prepared request for the at least one gap configuration to the first network operator device.

In an embodiment, when the gap is quite long or unpredictable for an activity on second network operator device, UE can indicate to the first network operator device for the leaving of the RRC connection. For this purpose, UE can utilize one of RRC signaling message (e.g. UE assistance information) and MAC CE message. The message may include at least one of a preferred RRC state (e.g. RRC CONNECTED state, OutofConnected and/or RRC IDLE state or RRC Inactive state) as an indication for leaving RRC connection. In this case, UE does not undertake switching gap on first network operator and rather releases the RRC connection. Thereafter, UE connects with second network operator to perform desired activity.

Accordingly, the embodiment herein is to provide a method for gap scheduling for UE comprising a plurality of SIMs in a wireless network. The method includes receiving, by a first network operator device associated with a first SIM from the plurality of SIMs, a request for at least one gap configuration from the UE. The UE is in connected mode with the first SIM and is in idle or inactive mode with at least one second SIM of the plurality of SIMs. Further, the method includes determining, by the first network operator device, at least one gap configuration based on a plurality of parameters. Further, the method includes sending, by the first network operator device, at least one gap configuration corresponding to at least one gap to the UE. Further, the method includes receiving, by the first network operator device, a gap activation request to activate the at least one gap from the UE for switching to at least one second network operator device associated with the at least one second SIM for service reception on the second SIM during the at least one activated gap on the first SIM. Further, the method includes sending, by the first network operator device, a gap activation response to the UE allowing the activation of the at least one gap based on the at least one gap configuration.

In an embodiment, further, the method includes receiving, by the first network operator device, a gap release request from the UE to release the at least one gap on the first SIM. The gap release request includes a gap configuration identity or an index of the at least one gap. Further, the method includes sending, by the first network operator device, a gap release response to the UE allowing the UE to release the at least one gap on the first SIM.

In an embodiment, further, the method includes receiving, by the first network operator device, a capability information of the UE from the UE indicating that the UE has the capability for switching gap. Further, the method includes sending, by the first network operator device, a response to the UE allowing the UE for switching gaps.

In an embodiment, the plurality of parameters comprises at least one of SMTC (SSB based Measurement Timing Configuration) occasions for a serving cell, Synchronization Signal block (SSB), paging configurations, SIB scheduling configurations, Channel State Information Reference Signal (CSIRS) configurations for the serving cell, Reference Signal Received Power (RSRP), Reference Signal Strength Indicator (RSSI), Reference Signal Received Quality (RSRQ), Signal to Interference Noise Ratio (SINR), Block Error Rate/Packet Error Rate (BLER/PER), Channel Quality Indicator (CQI), Quality of Service (QoS), a reliability performance of service, and a continuity of service on the at least one second SIM.

Accordingly, the embodiment herein is to provide a UE for gap scheduling in a wireless network. The UE includes a memory comprising a plurality of SIMs, a processor, and a gap scheduling controller connected to the memory and the processor. The gap scheduling controller is configured to send a request for at least one gap configuration to a first network operator device associated with a first SIM from the plurality of SIMs. The UE is in connected mode with the first SIM and is in idle or inactive mode with at least one second SIM of the plurality of SIMs. Further, the gap scheduling controller is configured to receive at least one gap configuration corresponding to at least one gap from the first network operator device. Further, the gap scheduling controller is configured to activate the at least one gap on the first SIM based on the at least one gap configuration. Further, the gap scheduling controller is configured to switch to at least one second network operator device associated with the at least one second SIM for service reception on the second SIM during the at least one activated gap on the first SIM.

Accordingly, the embodiment herein is to provide a first network operator device for gap scheduling for UE comprising a plurality of SIMs in a wireless network. The first network operator device includes a memory, a processor, and a gap scheduling controller connected to the memory and the processor. The gap scheduling controller is configured to receive a request for at least one gap configuration from the UE. The first network operator device is associated with a first SIM from the plurality of SIMs of the UE. The UE is in connected mode with the first SIM and is in idle or inactive mode with at least one second SIM of the plurality of SIMs. Further, the gap scheduling controller is configured to determine at least one gap configuration based on a plurality of parameters. Further, the gap scheduling controller is configured to send at least one gap configuration corresponding to at least one gap to the UE. Further, the gap scheduling controller is configured to receive a gap activation request to activate the at least one gap from the UE for switching to at least one second network operator device associated with the at least one second SIM for service reception on the second SIM during the at least one activated gap on the first SIM. Further, the gap scheduling controller is configured to send a gap activation response to the UE allowing the activation of the at least one gap based on the at least one gap configuration.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF DRAWINGS

The embodiments are illustrated in the accompanying drawings, throughout which like reference letters indicate corresponding parts in the various figures. The embodiments herein will be better understood from the following description with reference to the drawings, in which:

FIGS. 5A and 5B are flow charts illustrating a method, implemented by the network operator device, for gap scheduling for the UE including the plurality of SIMs in the wireless network, according to an embodiment as disclosed herein;

FIG. 14 is a flow chart illustrating a method for gap scheduling for the UE including the plurality of SIMs in the wireless network, according to an embodiment as disclosed herein.

MODE FOR THE INVENTION

Figure 1:
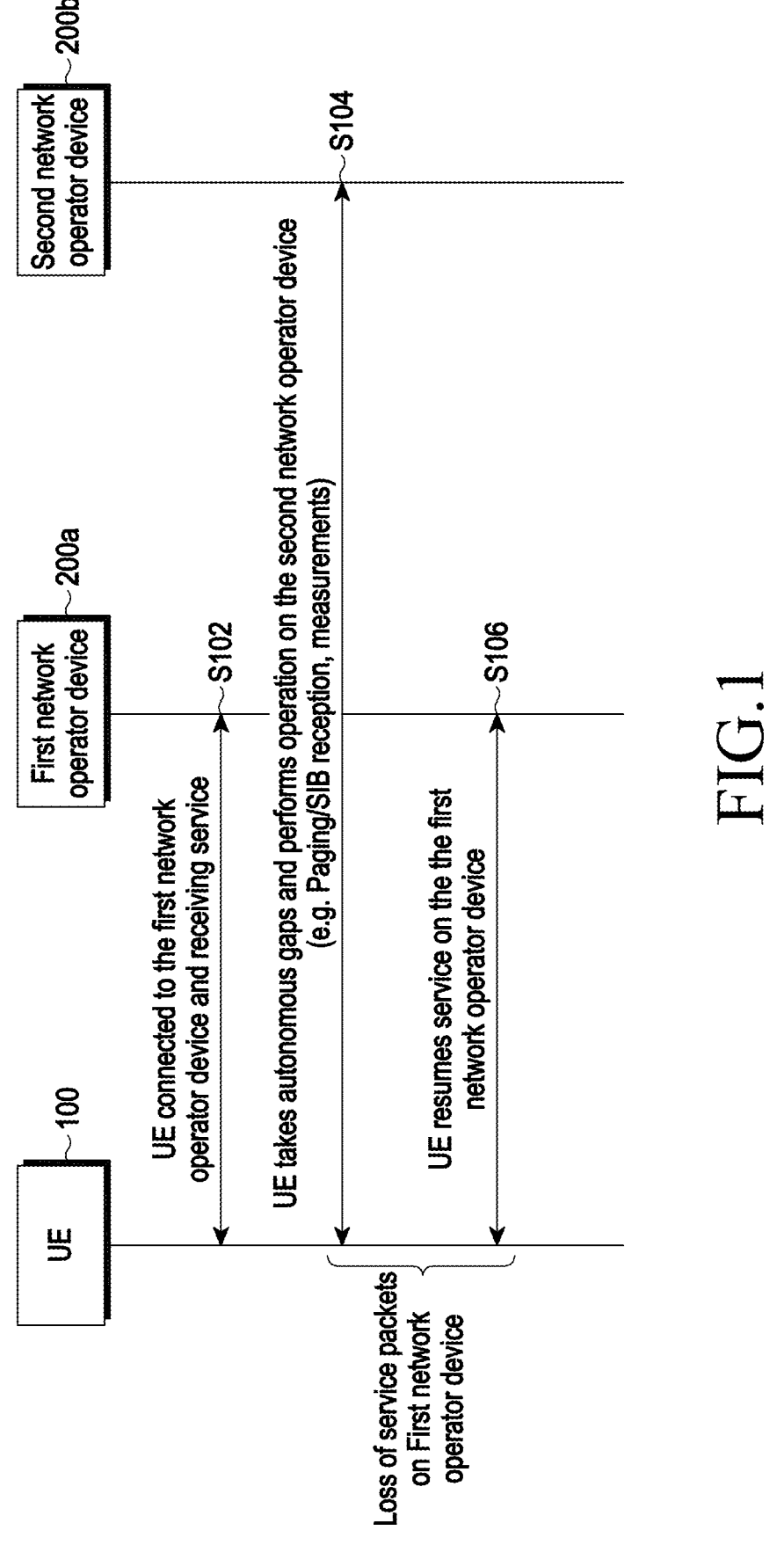
FIG. 1 is a sequence flow diagram illustrating that a UE takes autonomous gaps and performs operation on a second network operator device based on paging/SIB reception or measurements, according to prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for gap scheduling for a UE comprising a plurality of SIMs in a wireless network. The method includes sending, by the UE, a request for at least one gap configuration to a first network operator device associated with a first SIM from the plurality of SIMs. The UE is in connected mode with the first SIM and is in an idle mode or an inactive mode with at least one second SIM of the plurality of SIMs. Further, the method includes receiving, by the UE, at least one gap configuration corresponding to at least one gap from the first network operator device. Further, the method includes activating, by the UE, the at least one gap on the first SIM based on the at least one gap configuration. Further, the method includes switching, by the UE, to at least one second network operator device associated with the at least one second SIM for service reception on the second SIM during the at least one activated gap on the first SIM.

The proposed method can be used to ensure that a service performance is maintained at best possible level for each of the SIMs in consideration to the kind of activities or services being availed on each SIM/network. The method can be used to reduce the power usage and improve the scheduling resources for both UE and networks.

The proposed method can be used to save the network resources, improve the UE performance, prevent loss of data and increase reliability with coordinated gap and network switching operation.

Referring now to the drawings and more particularly to FIGS. 2 through 14, where similar reference characters denote corresponding features consistently throughout the figures, there are shown preferred embodiments.

Figure 2:
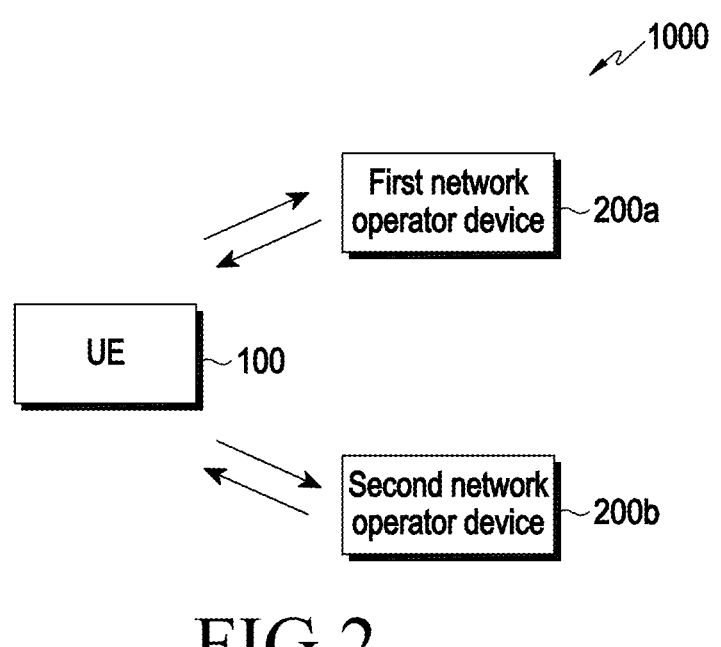
FIG. 2 is an overview of a wireless network for gap scheduling for the UE comprising a plurality of SIMs, according to an embodiment as disclosed herein.

FIG. 2 is an overview of a wireless network 1000 for gap scheduling for a UE 100 comprising a plurality of SIMs 150 (as shown in the FIG. 3A), according to an embodiment as disclosed herein. In an embodiment, the wireless network 1000 includes the UE 100, a first network operator device 200*a* and a second network operator device 200*b*. The UE 100 is communicated with the first network operator device 200*a* and the second network operator device 200*b* through a wireless communication medium or a wired communication medium. The UE 100 can be, for example, but not limited to a smart phone, a smart watch, a laptop, a foldable device, an internet of things (IoT) device, an immersive device, a Television with communication facility, a connected car or a vehicular communication device and a virtual reality device. The wireless network 1000 can be, for example, but not limited to a 4G wireless network, a 5G wireless network and a 6G wireless network.

The UE 100 is configured to send a request for a gap configuration to the first network operator device 200a associated with a first SIM 150a (as shown in the FIG. 3A) from the plurality of SIMs 150. The UE 100 is in the connected mode with the first SIM 150a and is in the idle or the inactive mode with a second SIM 150b-150n (as shown in the FIG. 3A). In an embodiment, the UE 100 is configured to prepare the request for the gap configuration based on a paging configuration, a measurement configuration, and a DRX configuration of the second SIM 150b-150n and send the prepared request for the gap configuration to the first network operator device 200a.

In an embodiment, the UE 100 sends the gap request to the first network operator device 200a to configure (setup or modify) the at least one gap on the first SIM. The gap request comprises at least one of a gap configuration identity or an index, gap-offset (e.g., start time for each period and is mapped to the timings mapped to at least one second network operator device 200b), periodicity (repetition pattern), gap duration of the at least one gap. Additionally, the UE 100 may include the purpose or cause for the gap and/or preferred RRC state the UE 100 want to be in (e.g. RRC connected state, OutofConnected and/or RRC idle state or an RRC inactive state). If the aperiodic gap is requested, then periodicity (repetition pattern) may be absent. Further, gap-offset (start time e.g. starting System Frame Number (SFN) and subframe) is mapped to the timings mapped to at least one second network operator device 200b. Further, the UE 100 receives a gap configuration from the first network operator device 200a allowing the UE 100 to configure the at least one gap on the first SIM. The gap request is sent by the UE 100 to the first network operator 200a through the RRC signaling message e.g. UE assistance information message. In an example, the gap request message can include request for N periodic gaps and M aperiodic gaps.

In an embodiment, the same message (e.g. UE assistance information message) can carry the setup (gap request) or release of the gaps. That is, the same message can carry gap set up for at least one of periodic and/or aperiodic gaps and release of at least one of periodic and/or aperiodic gaps in the same message at same time.

The first network operator device 200a is configured to receive the request for the gap configuration from the UE 100. After receiving the request, the first network operator device 200a is configured to determine the gap configuration based on the plurality of parameters. The plurality of parameters can be, for example, but not limited to SMTC occasions for a serving cell, a SSB, CSIRS configurations for the serving cell, paging configurations, SIB scheduling configurations, a RSRP, a RSSI, a RSRQ, a SINR, a BLER/PER, a CQI, a QoS, a reliability performance of service, and a continuity of service on the second SIM 150b-150n. Further, the first network operator device 200a is configured to send the gap configuration corresponding to the gap to the UE 100.

Further, the UE 100 is configured to receive the gap configuration corresponding to the gap from the first network operator device 200a. Based on the gap configuration, the UE 100 is configured to activate the gap on the first SIM 150. In an embodiment, the gap on the first SIM 150a is activated by sending a MAC CE to activate the gap to the first network operator device 200a, and receiving the gap indication from the first network operator device 200a allowing the activation of the gap based on the gap configuration. The MAC CE includes an index of the gap and when the gap is periodic a gap offset, and when the gap is dynamic, a gap offset or activation time for the gap, a duration of the gap. In another embodiment, the gap on the first SIM 150a is activated by sending a gap activation request through the RRC signalling (e.g. UE assistance information message) to activate the gap to the first network operator device 200a, and receiving a gap activation response from the first network operator device 200a allowing the activation of the gap based on the gap configuration.

Based on the gap configuration, the UE 100 is configured to switch to second network operator device 200b associated with the second SIM 150b-150n for service reception on the second SIM 150b-150n during the activated gap on the first SIM 150a. Further, the UE 100 is configured to send the gap release request to the first network operator device 200a to release the gap on the first SIM 150a. The gap release request includes a gap configuration identity or an index of the gap.

Further, the first network operator device 200a is configured to receive the gap release request from the UE 100 to release the gap on the first SIM 150a. Further, the first network operator device 200a is configured to send a gap release response to the UE 100 allowing the UE 100 to release the gap on the first SIM 150a. Further, the UE 100 is configured to receive the gap release response from the first network operator device 200a allowing the UE 100 to release the gap on the first SIM 150a. The gap release request is sent in one of a RRC message (e.g. UE assistance information message) and a MAC CE.

Further, the UE 100 is configured to send a capability information of the UE 100 to the first network operator device 200a indicating that the UE 100 has the capability for switching gap. Further, the UE 100 is configured to receive the response from the first network operator device 200a allowing the UE 100 for switching gaps. The request for the gap configuration includes a list of static or periodic gaps and a list of dynamic or aperiodic gaps. The list of static or periodic gaps has a known periodicity (repetition pattern), a gap-offset indicating a start time of the gap for each period and is mapped to the timings mapped to at least one second network operator device, and a duration of the gap. The list of dynamic or aperiodic gaps has a gap-offset indicating a start time of the gap e.g. starting System Frame Number (SFN) and sub-frame is mapped to the timings mapped to at least one second network operator device and a duration of the gap is known or not known a priory.

In an embodiment, the network configures UE with " " of RRC reconfiguration message to provide MUSIM assistance though UE assistance information message. This configuration can be in accordance to the capability information provided by the UE. When the UE receives the configuration for " " from RRC reconfiguration message, UE pursues providing MUSIM assistance through UE assistance information message e.g. for at least one of gap request, gap release and gap activation request.

In an embodiment, when the gap is quite long or unpredictable for an activity on the second network operator device 200b, the UE 100 can indicate to the first network operator device for the leaving of the RRC connection. For this purpose, the UE 100 can utilize one of the RRC signaling message (e.g. UE assistance information) and the MAC CE message. The message may include at least one of a preferred RRC state (e.g. RRC connected state, OutofConnected and/or RRC Idle state or RRC Inactive state) as an indication for leaving RRC connection. In this case, the UE does not undertake switching gap on first network operator device 200*a* and rather releases the RRC connection. Thereafter, the UE 100 connects with the second network operator device 200*b* to perform desired activity.

Further, the UE 100 is configured to perform paging on the second network operator device 200*b* during the gap. Further, the UE 100 is configured to send a "busy" or "not busy" indication to the second network operator device 200*b*. Based on the sending the busy indication, the UE 100 is configured to stop the paging on the second network operator device 200*b*.

In the wireless network 1000, the proposed method describes the operations considering two SIMs 150*a* and 150*b* for the illustration purpose. However, this does not limit the methods and description for multiple SIM cases e.g. where more than two SIMs are supported like 3 SIMs, 4 SIMs, 5 SIMs and so on in the same UE 100. Further illustration, description considers one of the SIM in the connected mode and other SIM in idle/inactive mode. However, the methods can be extended to other modes/states and combinations thereof. Also, Radio Access Technology (RAT) of the SIMs can also pertain to others RATs than 5G like 2G, 3G, 4G, 6G, wireless fidelity (Wi-Fi) and so on and possible combinations thereof.

In an example, a New Radio or 5G UE (NR UE) 100 in the idle/inactive mode calculates it's a Paging Occasion (PO) and a Paging Frame (PF) based on its UE ID and N, where the UE ID: 5G-S-TMSI mod 1024, and N: number of total paging frames in a DRX cycle T of UE. Based on the PO and PF, the NR UE 100 monitors the Physical Downlink Control Channel (PDCCH) to read paging DCI i.e. Downlink Control Information (DCI format 1_0 with CRC scrambled by P-RNTI i.e. Paging Radio Network Terminal Identifier) and further reads the paging message. The UE 100 decides if the paging message is intended for it only after reading the actual paging message. All other UEs 100 discard the paging message as a False Alarm. This way, a group of UEs (paging group) reads PDCCH and further paging message based on respective UE_ID and N on the same PO and PF.

The PF and PO for paging are determined by the following formulae:

SFN for the PF is determined by:

$$(\text{SFN}+\text{PF\_offset})\bmod T=(T \text{ div } N)*(\text{UE\_ID} \bmod N)$$

Index (is), indicating the index of the PO is determined by:

$$i\_s=\text{floor}(\text{UE\_ID}/N)\bmod Ns$$

The following parameters are used for the calculation of PF and is above:

T: DRX cycle of the UE,
N: number of total paging frames in T,
Ns: number of paging occasions for a PF,
PF_offset: offset used for PF determination, and
UE_ID: 5G-S-TMSI mod 1024
In case when the SIM belongs to LTE, UE_ID: IMSI mod 1024
In an example, International Mobile Subscriber Identity (IMSI) is a permanent UE identity whereas 5G-S-Temporary Mobile Subscriber Identity (TMSI) is a temporary identity which can be reassigned by a core network to the UE frequently e.g. possibly at every cell reselection a new 5G-S-TMSI could be reassigned.

Apart from paging, one or more of the multiple SIMs 150 can be engaged in system information block (SIB) acquisition, measurements, data or voice call, Multicast and Broadcast Service (MBS) reception, emergency call, access stratum (AS) signaling, Non-access stratum (NAS) signaling and so on. Some of these operations are periodic like paging, measurements and some are aperiodic and/or un-deterministic like signaling. Further, duration required to complete the operation may also be fixed or unpredictable.

For MUSIM devices, even though UE 100 supports multiple SIMs 150 and thereby connectivity with multiple networks, however, due to common RF circuitry only one active connection at a time is maintained. That implies UE 100 needs to switch from one network operator device 200*a* to another network operator device 200*b* in time to access and avail connectivity. Based on the activities on the specific network, arbitration of the RF between multiple SIMs 150 (and the protocol stocks they support) is to be performed. Objective is to ensure the service performance is maintained at best possible level for each of the SIMs 150 in consideration to the kind of activities or services being availed on each SIM/network. Therefore, when the RF is tuned away to one of the SIM 150*a*, other SIMs 150*b*-150*n* see it as gap and no uplink or downlink data transfer or no other activities like paging reception or measurement operations can be performed in the gap. Basically other SIMs 150*b*-150*n* need to wait through the gap duration to be able to access RF resource again and be operational.

In one of the embodiment, the method can be used to target the dynamic gap which can be un-deterministic in occurrence. Therefore, such gap cannot be planned beforehand. Also it is important that during the gap network also does not transmit anything to the UE 100 nor expects any reception from the UE 100. The network operator device 200*a* can rather utilize these transmission resources for the other UEs. For this, it is required that the network operator device 200*a* is aware or rather, is informed about the gap. Since the gap is dynamic, the network operator device 200*a* cannot be informed beforehand. Also, the network operator device 200 cannot know about the gap as there is no coordination with other network(s) servicing other SIMs 150*b*-150*n* on the MUSIM device. Besides, also the periodic gaps may not be taken by the UE 100 always e.g. it may coincide or conflict with some other priority task. Therefore, it also needs a dynamic mechanism to inform the network operator device 200*a* as and when needed.

In an example, for illustration purpose, consider a scenario where the MUSIM UE 100 comprises of two SIMs and one of the SIMs, SIM A (network A) is connected mode and other SIM B (network B) is in the idle/inactive mode. In order to maintain the link connectivity and avail paging on the SIM B, SIB, paging, measurement operations may need to be performed on the SIM B on a periodic basis. Besides, there may be some un-deterministic occurrence of signaling need e.g. sending paging response and dynamic gap may be required.

On the SIM B, which is in the idle mode or the inactive mode, the paging would be monitored for periodically. In case there is a true paging (i.e. paging identity matches with the UE ID on SIM B), the SIM B would either decide to pursue the call or data session or would need to decline e.g. higher priority service or activity is ongoing on the SIM A (this could be SIM B's busy indication to the network B). If the SIM B does not share busy indication and not pursue the call/data session, the network operator device 200*a* will not get to know UE's status and not aware as to why page response is not received. It could be either UE 100 is not able to decode the paging or the UE 100 in unreachable, in that case network operator device 200*a* has to extend the page coverage area to broadcast the paging in larger area so as to reach the UE 100. With the busy indication, the network operator device 200*a* is notified that the SIM B is not interested or could not accept the call. Therefore, the network operator device 200*a* may not pursue paging again or not extend the page coverage area.

In one of the embodiment, to have a common behavior for MUSIM UE 100, the RRC provides an upper layer (e.g. Non-Access Stratum (NAS) layer) with page-cause (including none) on the network B along with ongoing service information (e.g. priority), if any, on other network A. Assuming potentially many causes/priorities for paging/service, it is decided to respond paging with either busy indication on RRC connection or resumption (i.e. busy indication in RRC-Inactive mode when paging is received). In an embodiment, in case the UE 100 is in the RRC-Inactive, then the RAN node will not need to forward the busy indication to the AMF. Some related aspects in the invention include—

1. Defining a new field or new resume cause to indicate busy in a RRCResumeRequest.
2. In response to RRCResumeRequest with busy indication possibly a confirmation message or Suspend configuration or RRCRelease message is received.

In one of the embodiment, the UE 100 could also indicate the duration of the busy status and/or reason for busy indication like busy on other SIM/Network and/or priority of service on other SIM (SIM A) which caused busy indication for SIM B and/or UE's 'do not disturb' status to the network 200. Alternatively, the UE 100 would also share 'not busy' indication once it gets available on SIM B to receive paging again. This could be because activity on SIM A is completed/terminated and/or priority of SIM A activity is reduced. In another approach, the UE 100 is still paged for higher priority of services on SIM B but not for lower or equal priority of services e.g. critical/emergency/public safety services are still allowed to cause paging to the UE 100.

Further, the busy indication or the page response on the SIM B causes back to back gap for the SIM A as firstly there is a periodic gap for paging monitoring and then there is undeterministic gap for the page response or the busy indication, only if true paging is received. In another embodiment, a method for static or periodic and dynamic or aperiodic scheduling gap is provided. It is described as follows—

1. Firstly, the UE 100 provides the UE capability for gap request to the network operator device 200*a*. This is a RRC message based signaling e.g., UE assistance information message.
2. The network operator device 200*a* receives capability message from the UE 100 and allows the UE 100 to make gap request.
3. The UE requests gap—For this purpose, RRC signaling like UE assistance information message can be used. Alternatively, some NAS signaling can also be used. The UE gap request carries a list of static or periodic gaps which are having known periodicity (repetition pattern), gap-offset (start time for each period and is mapped to the timings mapped to at least one second network operator device 200*b*) and gap duration. Additionally, there is a list of aperiodic or dynamic gaps for which gap-offset (start time) e.g. starting System Frame Number (SFN) and sub-frame is mapped to the timings mapped to at least one second network operator device and gap duration may or may not be known a priory.

4. Network configures gap—The network operator device 200*a* receives the message from the UE 100 for gap configurations and allow gap request by providing a confirmation message or allowed gap configurations in downlink. In certain conditions, the network operator device 200*a* can as well reject the gap request (or at least one of the gap as requested) as well when there is incorrect request or the network operator device 200*a* does not want the UE 100 to avail gap due to possibility of some downlink activities or data arrival etc.
5. (one shot) gap request—the UE 100 sends the RRC signaling message such as UE assistance information message or MAC CE to activate one of the configured gap. The RRC message or MAC CE includes the index of the gap. If it is periodic gap, gap configuration includes the gap offset. In case of dynamic gap, the RRC message or MAC CE also includes the gap offset or activation time for the gap and possibly duration of the gap. This informs the network operator device 200*a* to start the gap from a specified start time and the network operator device 200*a* can schedule data for present UE (SIM A) until the activation time and during the gap, use resources for other UEs. With activation time, a clear timing is established between the UE 100 and the network operator device 200*a* and performance is maintained at best possible level until gap starts. Without activation time in MAC CE, it is not full-proof to assume gap start timing post HARQ ACK reception (e.g. immediate/after a stipulated time etc.) and performance can degrade if the network operator device 200*a* applies gap start incorrectly. In case the MAC CE transmission is not successful, as determined by HARQ ACK or confirmation from the network operator device 200*a*, the UE 100 can retransmit or reattempt to activate the gap. In case gap start time is already elapsed or not feasible to achieve, the UE 100 terminates the activation request. In certain cases, when periodic gaps are configured, the UE 100 can use the RRC message or MAC CE for deactivation of the gap as it may not like to pursue gap. Therefore, there is an identification field for activation and deactivation MAC CE.
6. (one shot) gap indication—The network operator device 200*a* confirms the gap request from the UE 100. In certain cases, the network operator device 200*a* can also reject the gap request when it sees gap is not suitable at that point of time or some other activity is planned by the network operator device 200*a*.
7. Repeat 5 and 6 until gap is no longer needed—In case of multiple gaps or back-to-back gaps, the UE 100 repeatedly makes gap requests with the RRC message or MAC CE to avail gaps.
8. Gap release request—When UE 100 does not want to maintain any specific or all gap configurations, it sends gap release request or a modified gap configuration list through RRC signaling e.g. UE assistance information message. Alternatively, a specific gap or all gaps can be released by indicating through a MAC CE.
9. Network release the gap—Based on UE 100 request to release gap, the network operator device 200*a* provides a confirmation. The UE 100 therefore updates its gap configuration information or database.

In another embodiment, a method for scheduling gap is provided. This is applied to one shot gap which is not known beforehand. To avail the gap, the UE 100 sends the RRC message or MAC CE that includes (but not limited to) fields-Gap identification (e.g. short or long gap), gap-offset (activation or start time for gap e.g. starting System Frame Number (SFN) and sub-frame is mapped to the timings mapped to at least one second network operator device 200*b*), gap duration. Identity for Gap request MAC CE could be a new specified LC ID (Logical channel identity). The RRC message or MAC CE can be triggered anytime by the UE 100 when it seems the need for a dynamic/unpredictable gap for other SIM's operation purpose. These may include like paging response, busy indication or other AS or NAS signaling. In case, long gap is indicated, the RRC message or MAC CE can also be used to indicate a RRC connection release on the SIM A as the activity on the other SIM B can be quite long. In order to save power, it may be efficient to move to idle or inactive mode on SIM A. Further, in this case RRC message or MAC CE may not include other field like gap-duration. The RRC message or MAC CE may still have gap-offset field included if SIM B operation is not very immediately. Alternatively, for immediate application of RRC message or MAC CE, there is no gap-offset field is added in RRC message or MAC CE.

In another embodiment, the RRC message or MAC CE is used to activate and/or deactivate a configured gap (e.g. prior configured by RRC signaling e.g. gap request through UE assistance information or RRC configuration request or alternatively NAS signaling). For this purpose, the RRC message or MAC CE indicates the gap configuration index or identity which was configured or confirmed by the network operator device 200*a*. The activation will ask the network operator device 200*a* to activate or apply the gap which was previously requested and/or configured. Deactivation would indicate to the network operator device 200*a* that the UE 100 is not looking forward for the use or application of the gap which was previously requested and/configured. With deactivation, the UE 100 can respond to any urgent need of handling some activity or services and be available with network resources and connectivity.

In another embodiment, gaps configurations for static or periodic and/or dynamic or aperiodic gaps are provided such that gap configurations consider SMTC occasions so as to have SSB (Synchronization Signal block)/CSIRS (Channel State Information Reference Signal) resources are available just before going into gap and/or these resources are available just after coming from gap. This enables the measurements can be performed immediately before and/or after gap, and this is useful and beneficial to avail time/frequency acquisition and synchronization. There are many reasons where TP performance degrades immediately after gaps as the UE 100 loses AGC (Automatic Gain Control)/AFC (Automatic Frequency Control) synchronization and CSI feedback estimates are poor. Therefore, it makes a strong case that gaps are designed considering the reference signal occasions before/after gaps. For this purpose, Gap configuration considers the SMTC configuration or timings (periodicity, duration, offset) for the serving cell and/or UE-specific dedicated CSI-RS configurations (i.e. occurrence e.g. periodicity, offset) for the serving cell. Accordingly, the activation time/gap-offset and gap durations are prepared and used in RRC message for gap request or MAC signaling like MAC CE.

In another embodiment, gaps configurations for the dynamic gap and its triggering RRC message or MAC CE also considers channel conditions like RSRP (Reference Signal Received Power), RSSI (Reference Signal Strength Indicator), RSRQ (Reference Signal Received Quality) or SINR (signal to Interference Noise Ratio etc. or BLER/PER (Block Error Rate/Packet Error Rate), CQI (Channel Quality Indicator).

In another embodiment, service quality, quality of service (QoS), reliability performance of service, continuity of service on second SIM of some of the services like receiving broadcast services, power saving/efficiency, user inputs/ preferences etc. are considered in deciding to conduct gap operation and determining associated gap parameters.

In another embodiment, the UE 100 also considers system parameters like paging configuration, measurement configuration like SMTC/CSIRS timings, SIB scheduling configurations, DRX configuration etc. of the other SIM, while preparing gap configuration or gap request on first SIM. For instance, the location of the PDSCH carrying paging information on other SIMs is considered while preparing gap offset and gap duration.

1. The UE 100 considers the cross-slot configuration (K0 parameter) for other SIMs. PDSCH location is related K0 parameter, which determines the gap between the PDCCH and the PDSCH.

A. If K0=0, the UE 100 considers the PDCCH and the PDSCH are in the same slot and ignore the PDSCH for paging collision determination, and B. If K0>0, the UE 100 considers there is cross-slot operation for paging, the PDCCH and the PDSCH are not in same slot and adds K0 to the duration while evaluating paging collision possibility. In certain cases, the PDSCH location may extend beyond the PF used for paging as well.

Figure 3A:
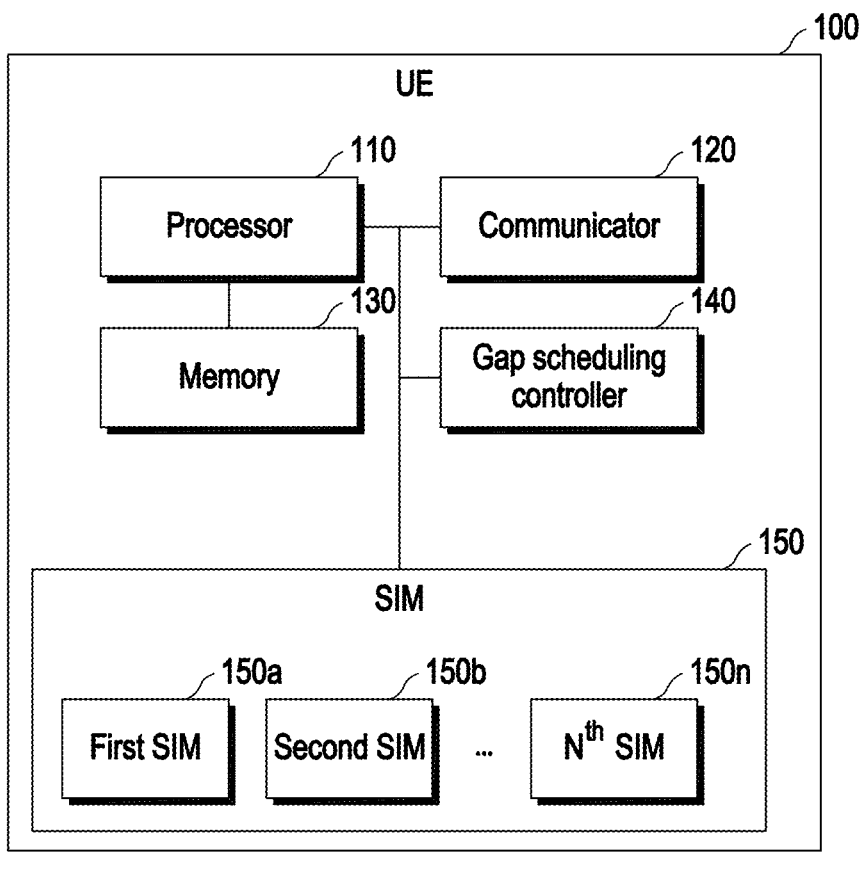
FIG. 3A shows various hardware components of the UE for gap scheduling, according to an embodiment as disclosed herein.

FIG. 3A shows various hardware components of the UE 100 for gap scheduling, according to an embodiment as disclosed herein. In an embodiment, the UE 100 includes a processor 110, a communicator 120, a memory 130, a gap scheduling controller 140, and the plurality of SIMs 150. The processor 110 is coupled with the communicator 120, the memory 130, the gap scheduling controller 140, and the plurality of SIMs 150.

The gap scheduling controller 140 is configured to send the request for the gap configuration to the first network operator device 200*a* associated with the first SIM 150*a* from the plurality of SIMs 150. The UE 100 is in the connected mode with the first SIM 150*a* and is in the idle or inactive mode with the second SIM 150*b*-150*n*. In an embodiment, the gap scheduling controller 140 is configured to prepare the request for the gap configuration based on the paging configuration, the measurement configuration, SIB scheduling configuration and the DRX configuration of the second SIM 150*b*-150*n* and send the prepared request for the gap configuration to the first network operator device 200*a*.

Further, the gap scheduling controller 140 is configured to receive the gap configuration corresponding to the gap from the first network operator device 200*a*. Based on the gap configuration, the gap scheduling controller 140 is configured to activate the gap on the first SIM 150*a*. In an embodiment, the gap on the first SIM 150*a* is activated by sending the RRC message or MAC CE to activate the gap to the first network operator device 200*a*, and receiving the gap indication from the first network operator device 200*a* allowing the activation of the gap based on the gap configuration. In another embodiment, the gap on the first SIM 150*a* is activated by sending the gap activation request to activate the gap to the first network operator device 200*a*, and receiving the gap activation response from the first network operator device 200*a* allowing the activation of the gap based on the gap configuration.

Further, the gap scheduling controller 140 is configured to switch to second network operator device 200*b* associated with the second SIM 150b-150n for the service reception on the second SIM 150b-150n during the activated gap on the first SIM 150a.

Further, the gap scheduling controller 140 is configured to send the gap release request to the first network operator device 200a to release the gap on the first SIM 150a. Further, the gap scheduling controller 140 is configured to receive the gap release response from the first network operator device 200a allowing the UE 100 to release the gap on the first SIM 150a.

Further, the gap scheduling controller 140 is configured to send a capability information of the UE 100 to the first network operator device 200a indicating that the UE 100 has the capability for switching gap. Further, the gap scheduling controller 140 is configured to receive the response from the first network operator device 200a allowing the UE 100 for switching gaps.

Further, the gap scheduling controller 140 is configured to perform paging on the second network operator device 200b during the gap. Further, the gap scheduling controller 140 is configured to send a busy or not busy indication to the second network operator device 200b. Based on the sending the busy indication, the gap scheduling controller 140 is configured to stop the paging on the second network operator device 200b.

The gap scheduling controller 140 is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor 110 is configured to execute instructions stored in the memory 130 and to perform various processes. The communicator 120 is configured for communicating internally between internal hardware components and with external devices via one or more networks. The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in Random Access Memory (RAM) or cache).

Although the FIG. 3A shows various hardware components of the UE 100 but it is to be understood that other embodiments are not limited thereon. In other embodiments, the UE 100 may include less or more number of components. Further, the labels or names of the components are used only for illustrative purpose and does not limit the scope of the invention. One or more components can be combined together to perform same or substantially similar function in the UE 100.

Figure 3B:
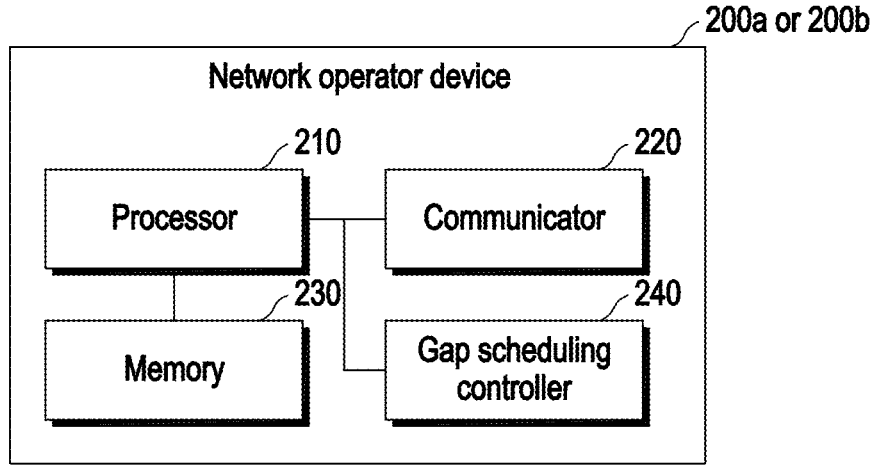
FIG. 3B shows various hardware components of a network operator device for gap scheduling for the UE comprising a plurality of SIMs in the wireless network, according to an embodiment as disclosed herein.

FIG. 3B shows various hardware components of the network operator device 200a or 200b for gap scheduling for the UE 100 comprising the plurality of SIMs 150 in the 5G wireless network 1000, according to an embodiment as disclosed herein. In an embodiment, the network operator device 200a or 200b includes a processor 210, a communicator 220, a memory 230, and a gap scheduling controller 240. The processor 210 is coupled with the communicator 220, the memory 230, and the gap scheduling controller 240.

The gap scheduling controller 240 is configured to receive the request for the gap configuration from the UE 100. The first network operator device 200a is associated with the first SIM 150a. Further, the gap scheduling controller 240 is configured to determine the gap configuration based on the plurality of parameters. The plurality of parameters can be, for example, but not limited to SMTC occasions for the serving cell, the SSB, CSIRS the configurations for the serving cell, paging configurations, SIB scheduling configurations, the RSRP, the RSSI, the RSRQ, the SINR, the BLER/PER, the CQI, the QoS, the reliability performance of service, and the continuity of service on the second SIM (150b-150n).

Further, the gap scheduling controller 240 is configured to send the gap configuration corresponding to the gap to the UE 100. Further, the gap scheduling controller 240 is configured to receive the gap activation request to activate the gap from the UE 100 for switching to the second network operator device 200b associated with the second SIM 150b-150n for service reception on the second SIM 150b-150n during the activated gap on the first SIM 150a. Further, the gap scheduling controller 240 is configured to send the gap activation response to the UE 100 allowing the activation of the gap based on the gap configuration.

Further, the gap scheduling controller 240 is configured to receive the gap release request from the UE 100 to release the gap on the first SIM 150a. Further, the gap scheduling controller 240 is configured to send the gap release response to the UE 100 allowing the UE 100 to release the gap on the first SIM 150a.

Further, the gap scheduling controller 240 is configured to receive a capability information of the UE 100 from the UE 100 indicating that the UE 100 has the capability for switching gap and send a response to the UE 100 allowing the UE 100 for switching gaps.

The gap scheduling controller 240 is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor 210 is configured to execute instructions stored in the memory 230 and to perform various processes. The communicator 220 is configured for communicating internally between internal hardware components and with external devices via one or more networks. The memory 230 also stores instructions to be executed by the processor 210. The memory 230 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 230 may, in some examples, be considered a non-transitory storage medium. The term "non-transitory" may indicate that the storage medium is not embodied in a carrier wave or a propagated signal. However, the term "non-transitory" should not be interpreted that the memory 230 is non-movable. In certain examples, a non-transitory storage medium may store data that can, over time, change (e.g., in Random Access Memory (RAM) or cache).

Although the FIG. 3B shows various hardware components of the network operator device 200a or 200b but it is to be understood that other embodiments are not limited thereon. In other embodiments, the network operator device 200a or 200b may include less or more number of components. Further, the labels or names of the components are used only for illustrative purpose and does not limit the scope of the invention. One or more components can be combined together to perform same or substantially similar function in the network operator device 200a or 200b.

Figure 4A:
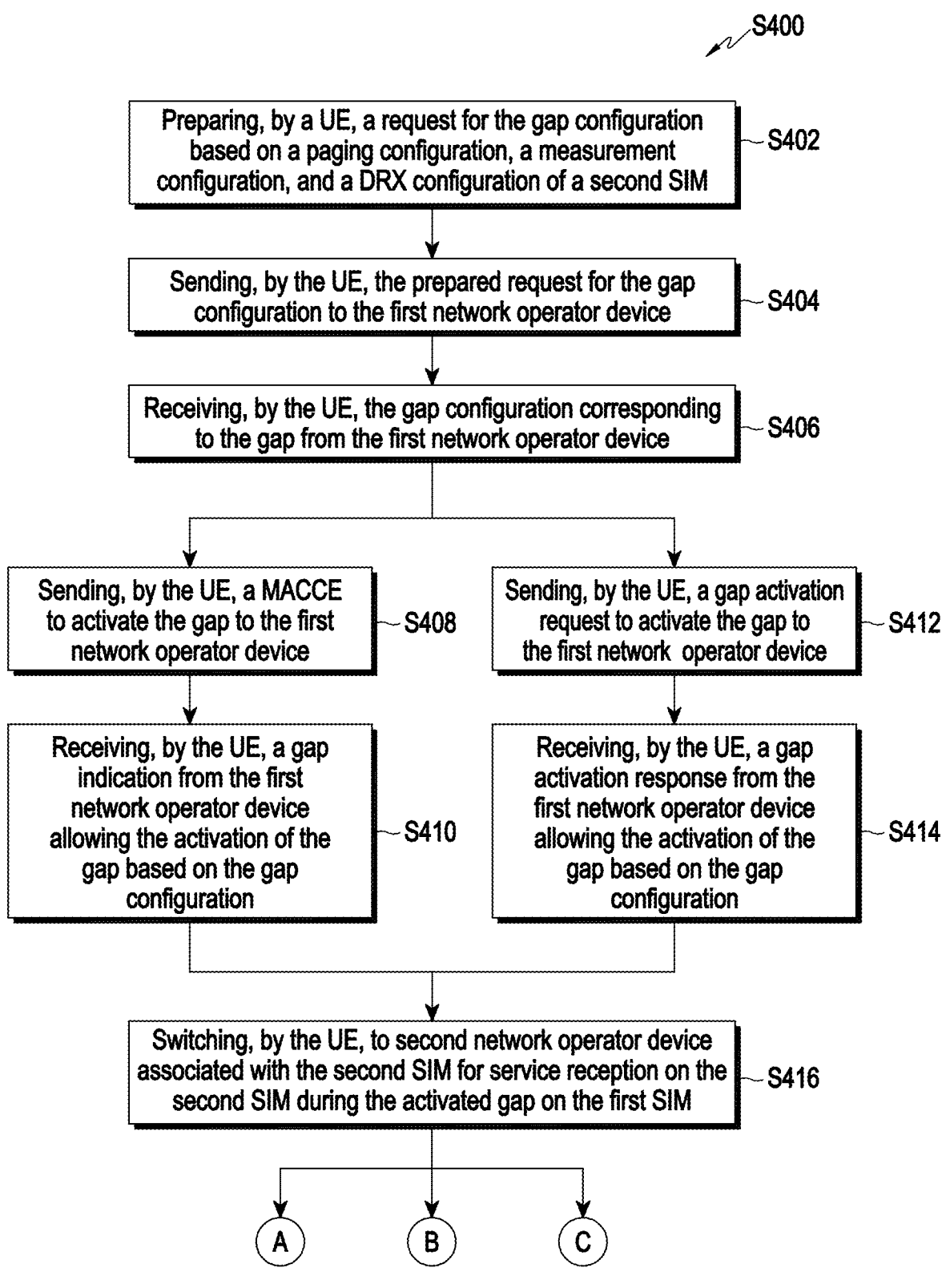
FIGS. 4A and 4B are flow charts illustrating a method, implemented by the UE, for gap scheduling for the UE including the plurality of SIMs in the wireless network, according to an embodiment as disclosed herein.
Figure 4B:
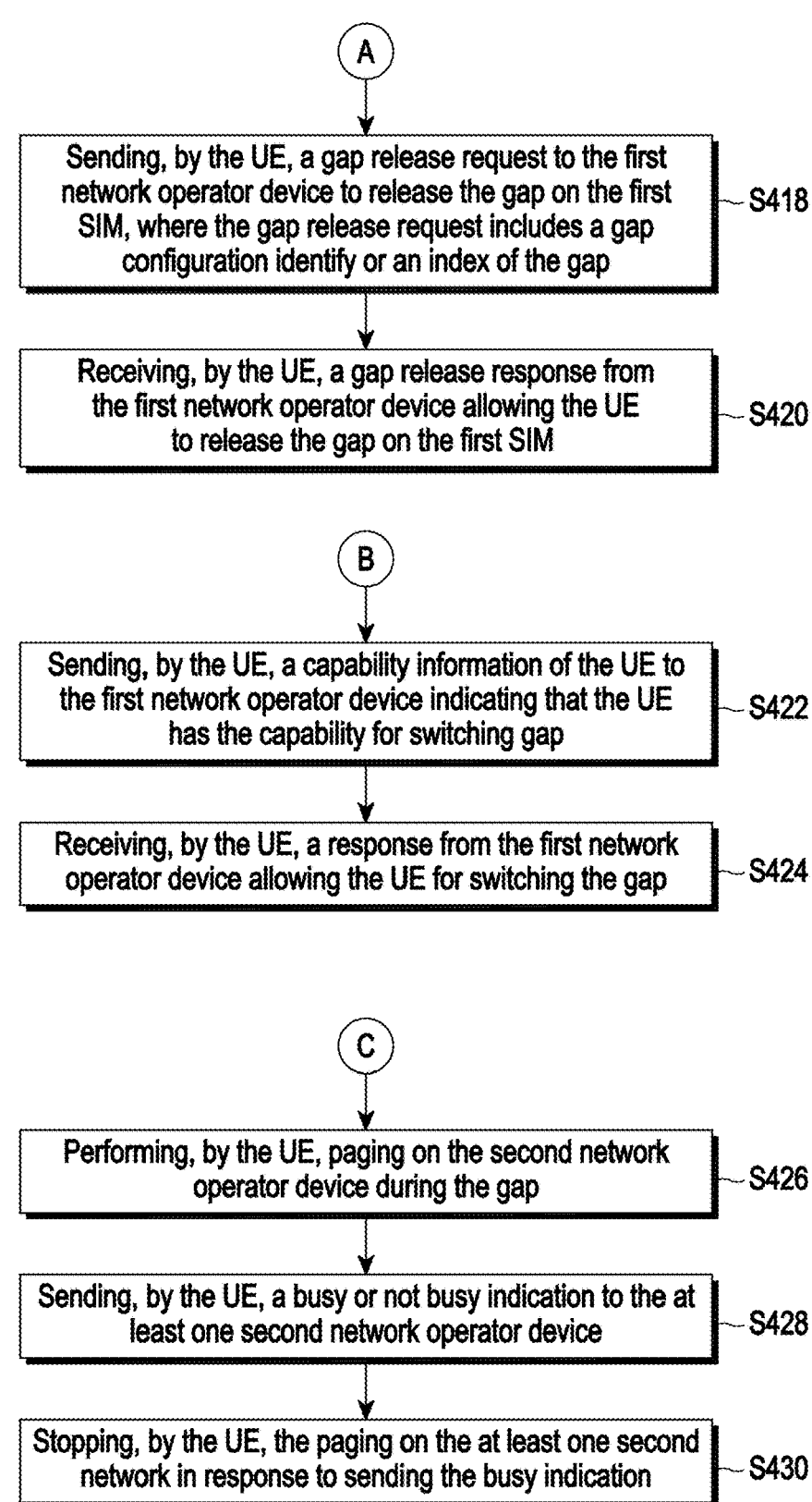

FIGS. 4A and 4B are flow charts (S400) illustrating a method, implemented by the UE 100, for gap scheduling for the UE 100 including the plurality of SIMs 150 in the wireless network 1000, according to an embodiment as disclosed herein. The operations (S402-S430) are handled by the gap scheduling controller 140.

At S402, the method includes preparing the request for the gap configuration based on the paging configuration, the measurement configuration, SIB scheduling configuration and the DRX configuration of the second SIM 150b. At S404, the method includes sending the prepared request for the gap configuration to the first network operator device 200a. At S406, the method includes receiving the gap configuration corresponding to the gap from the first network operator device 200a. At S408, the method includes sending the MAC CE to activate the gap to the first network operator device 200a. At S410, the method includes receiving the gap indication from the first network operator device 200a allowing the activation of the gap based on the gap configuration.

At S412, the method includes sending the gap activation request to activate the gap through the RRC signaling message (e.g. UE assistance information message) to the first network operator device 200a. At S414, the method includes receiving the gap activation response from the first network operator device 200a allowing the activation of the gap based on the gap configuration. At S416, the method includes switching to second network operator device 200b associated with the second SIM 150b for service reception on the second SIM 150b-150n during the activated gap on the first SIM 150a. At S418, the method includes sending the gap release request to the first network operator device 200a to release the gap on the first SIM 150a (e.g. through RRC signaling like UE assistance information message), where the gap release request includes a gap configuration identity or an index of the gap. At S420, the method includes receiving the gap release response from the first network operator device 200a allowing the UE 100 to release the gap on the first SIM 150a.

At S422, the method includes sending the capability information of the UE 100 to the first network operator device 200a indicating that the UE 100 has the capability for switching gap. The UE 100 sends the capability information through the RRC signaling message e.g. UE assistance information message, UE capability information message. At S424, the method includes receiving the response from the first network operator device 200a allowing the UE 100 for switching gaps. At S426, the method includes performing the paging on the second network operator device 200b during the gap. At S428, the method includes sending the busy or not busy indication to the second network operator device 200b. This can be sent using the NAS signaling or RRC signaling. At S430, the method includes stopping the paging on the second network operator device 200b in response to sending the busy indication.

Figure 5A:
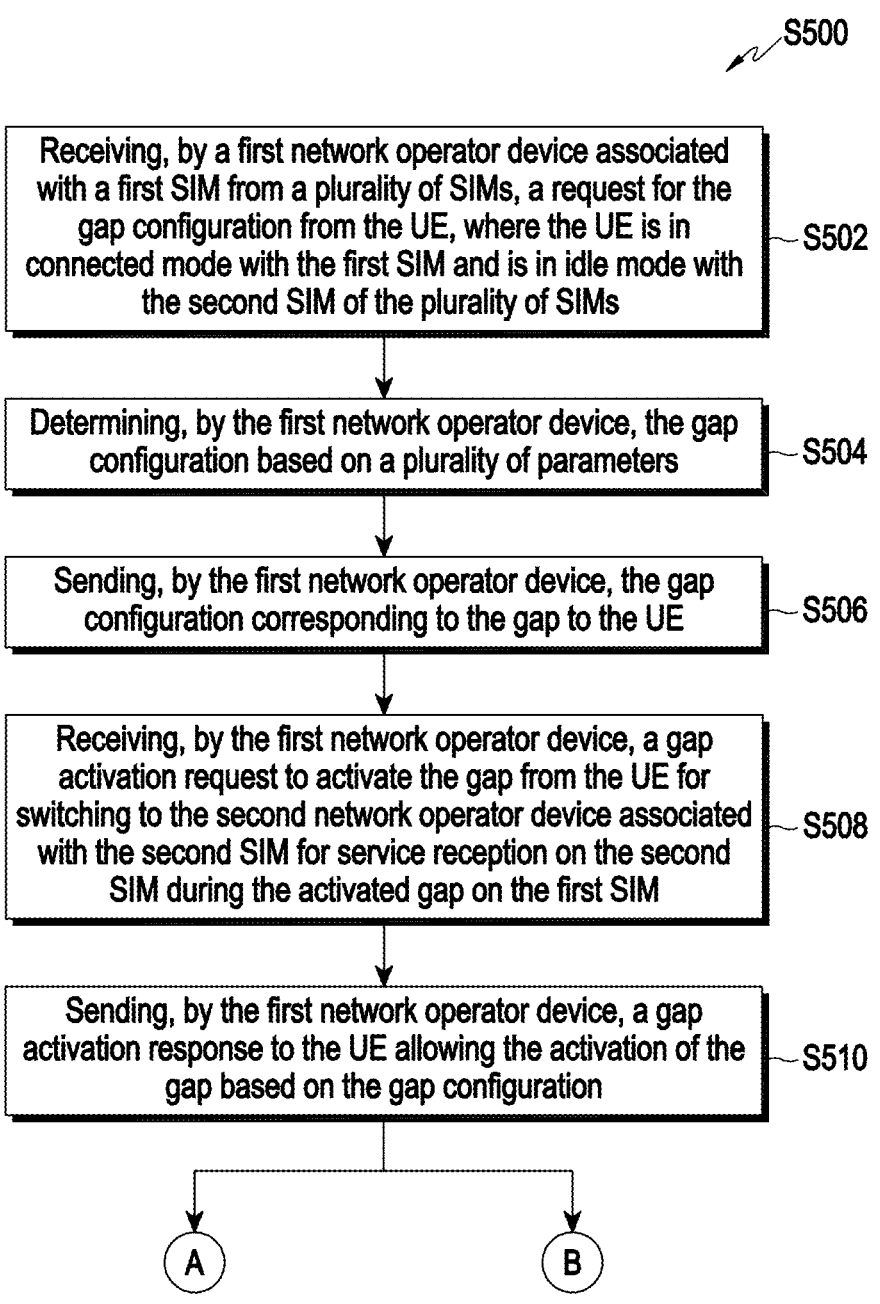

FIGS. 5A and 5B are flow charts (S500) illustrating a method, implemented by the network operator device 200a or 200b, for gap scheduling for the UE 100 including the plurality of SIMs 150 in the wireless network 1000, according to an embodiment as disclosed herein. The operations (S502-S518) are handled by the gap scheduling controller 240.

At S502, the method includes receiving, by the first network operator device 200a associated with the first SIM 150a from the plurality of SIMs 150, the request for the gap configuration from the UE 100. The UE 100 is in the connected mode with the first SIM 150a and is in the idle mode or the inactive mode with the second SIM 150b-150n of the plurality of SIMs 150. At S504, the method includes determining the gap configuration based on the plurality of parameters. At S506, the method includes sending the gap configuration corresponding to the gap to the UE 100. At S508, the method includes receiving the gap activation request to activate the gap from the UE 100 for switching to the second network operator device 200b associated with the second SIM 150b-150n for service reception on the second SIM 150b-150n during the activated gap on the first SIM 150a.

At S510, the method includes sending the gap activation response to the UE 100 allowing the activation of the gap based on the gap configuration. At S512, the method includes receiving the gap release request from the UE 100 to release the gap on the first SIM 150a. The gap release request includes the gap configuration identity or the index of the gap. At S514, the method includes sending the gap release response to the UE 100 allowing the UE 100 to release the gap on the first SIM 150b. At S516, the method includes receiving the capability information of the UE 100 from the UE 100 indicating that the UE 100 has the capability for switching gap. At S518, the method includes sending the response to the UE 100 allowing the UE 100 for switching gaps.

The method can be used to ensure that the service performance is maintained at best possible level for each of the SIMs in consideration to the kind of activities or services being availed on each SIM/network. The method can be used to reduce the power usage and improve the scheduling resources for both UE 100 and the networks 200a and 200b. The proposed method can be used to save the network resources, improve the UE performance, prevent loss of data and increase reliability with coordinated gap and network switching operation.

Figure 6:
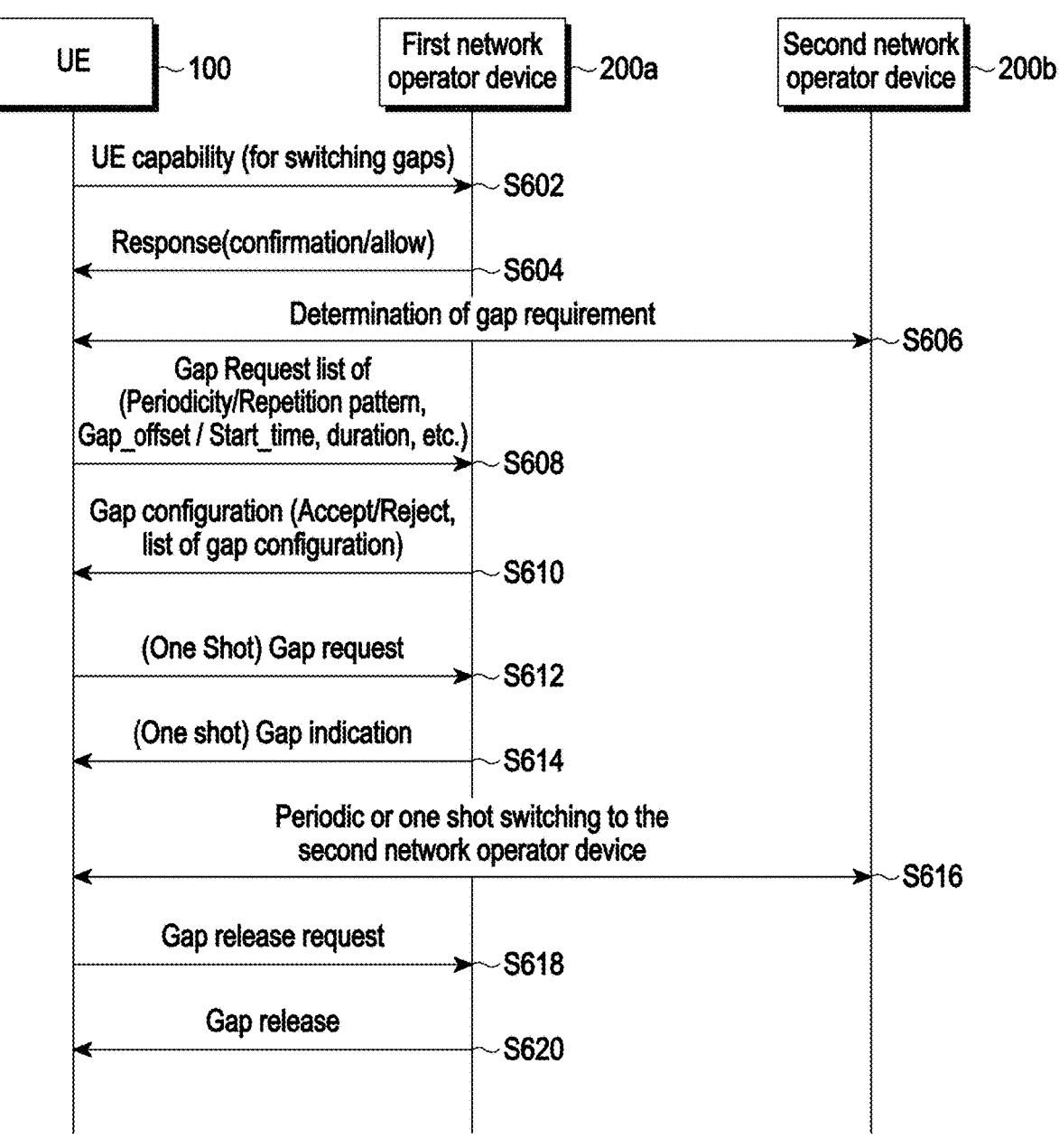
FIG. 6 is a sequence flow diagram illustrating step by step operations for gap scheduling for the UE including the plurality of SIMs in the wireless network based on determination of a gap requirement, according to an embodiment as disclosed herein.

FIG. 6 is a sequence flow diagram illustrating step by step operations for the gap scheduling for the UE 100 including the plurality of SIMs 150 in the wireless network 1000 based on determination of the gap requirement, according to an embodiment as disclosed herein.

At S602, the UE 100 sends the UE capability for switching gaps with the first network operator device 200a. At S604, the first network operator device 200a sends the response (confirmation/allow for the switching gaps) to the UE 100. At S606, the gap requirement is determined between the UE 100 and the second network operator device 200b. At S608, the UE 100 sends the gap request list of periodicity/repetition pattern, Gap_offset/Start_time, gap duration to the first network operator device 200a. At S610, the first network operator device 200a sends the gap configuration including the accept message/reject message and the list of gap configuration to the UE 100. At S612, the UE 100 sends the one shot gap request to the first network operator device 200a. At S614, the first network operator device 200a sends the one shot gap indication to the UE 100. At S616, the UE 100 performs the periodic or one shot switching to the second network operator device 200b. At S618, the UE 100 sends the gap release request with the first network operator device 200*a*. At S620, the first network operator device 200*a* sends the gap release to the UE 100.

Figure 7:
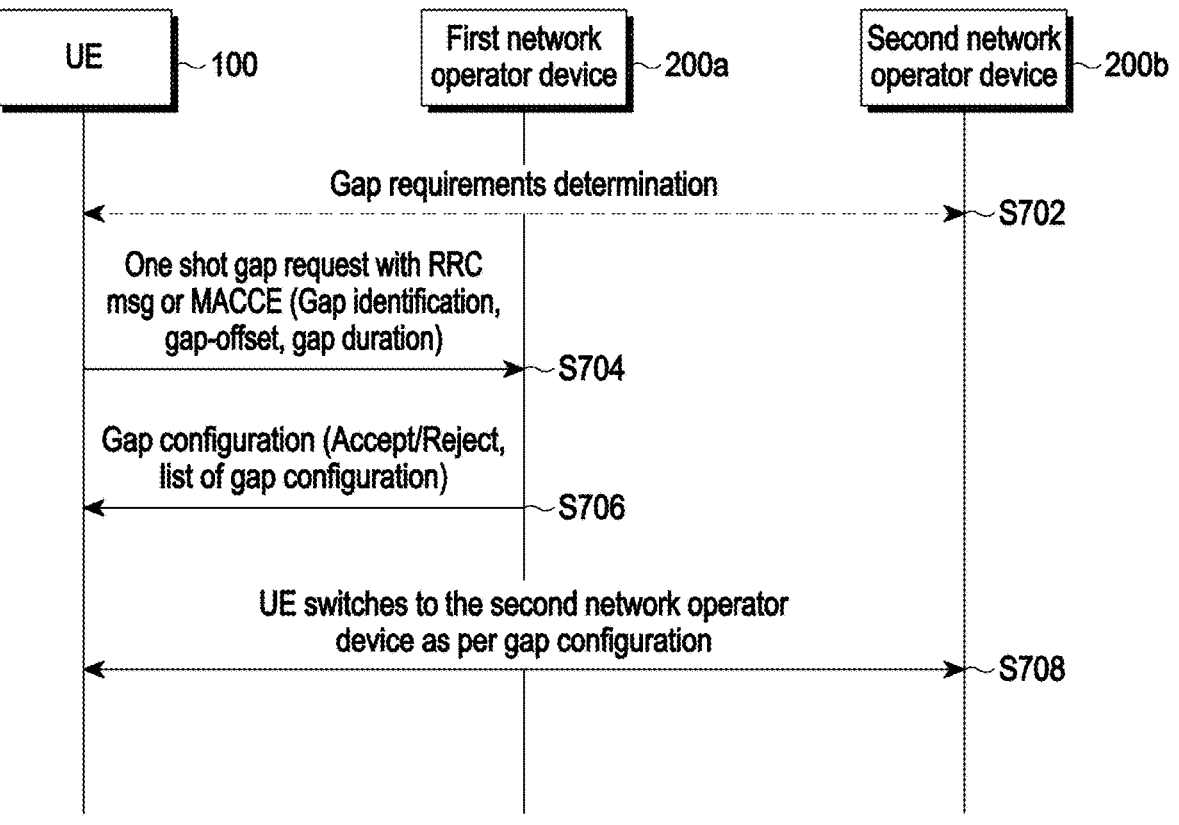
FIG. 7 is a sequence flow diagram illustrating step by step operations for gap scheduling for the UE including the plurality of SIMs in the wireless network based on a gap configuration, according to an embodiment as disclosed herein.

FIG. 7 is a sequence flow diagram illustrating step by step operations for the gap scheduling for the UE 100 including the plurality of SIMs 150 in the wireless network 1000 based on the gap configuration, according to an embodiment as disclosed herein. At S702, the gap requirement is determined between the UE 100 and the second network operator device 200*b*. At S704, the UE 100 sends the one shot gap request with the RRC message or MAC CE to the first network operator device 200*a*. The one shot gap request includes the gap identification, the gap-offset (e.g. starting System Frame Number (SFN) and sub-frame is mapped to the timings mapped to at least one second network operator device), and the gap duration. At S706, the first network operator device 200*a* sends the gap configuration (including the accept message/Reject message, and list of gap configuration) to the UE 100. At S708, the UE 100 switches to the second network operator device 200*b* as per gap configuration.

Figure 8:
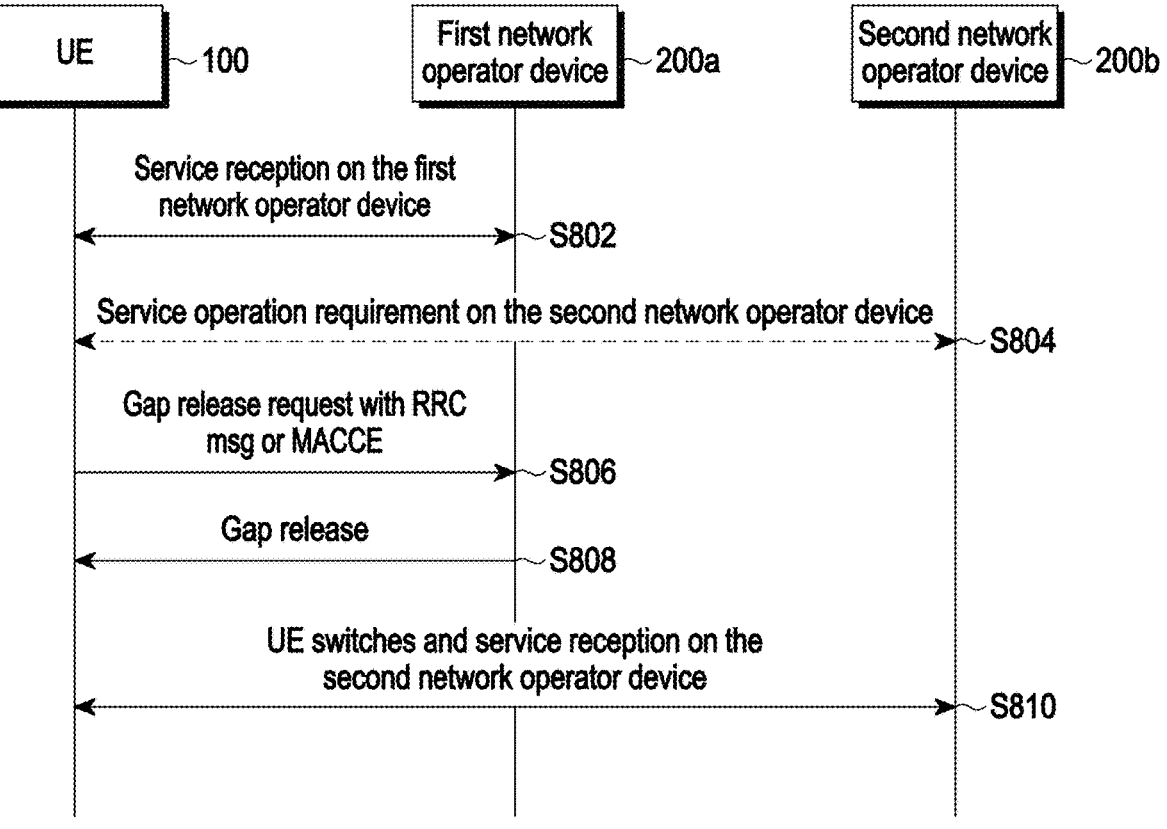
FIG. 8 is a sequence flow diagram illustrating step by step operations for gap scheduling for the UE including the plurality of SIMs in the wireless network based on a gap release request with one of a RRC message or a MAC CE, according to an embodiment as disclosed herein.

FIG. 8 is a sequence flow diagram illustrating step by step operations for gap scheduling for the UE 100 including the plurality of SIMs 150 in the wireless network 1000 based on the gap release request with the RRC message or MAC CE, according to an embodiment as disclosed herein. At S802, the UE 100 gets the service from the first network operator device 200*a*. At S804, the service operation requirement is determined between the UE 100 and the second network operator device 200*b*. At S806, the UE 100 sends the gap release request with the RRC message or MAC CE with the first network operator device 200*a*. At S808, the first network operator device 200*a* sends the gap release to the UE 100. At S810, the UE 100 switches and service reception on the second network operator device 200*b*.

Figure 9:
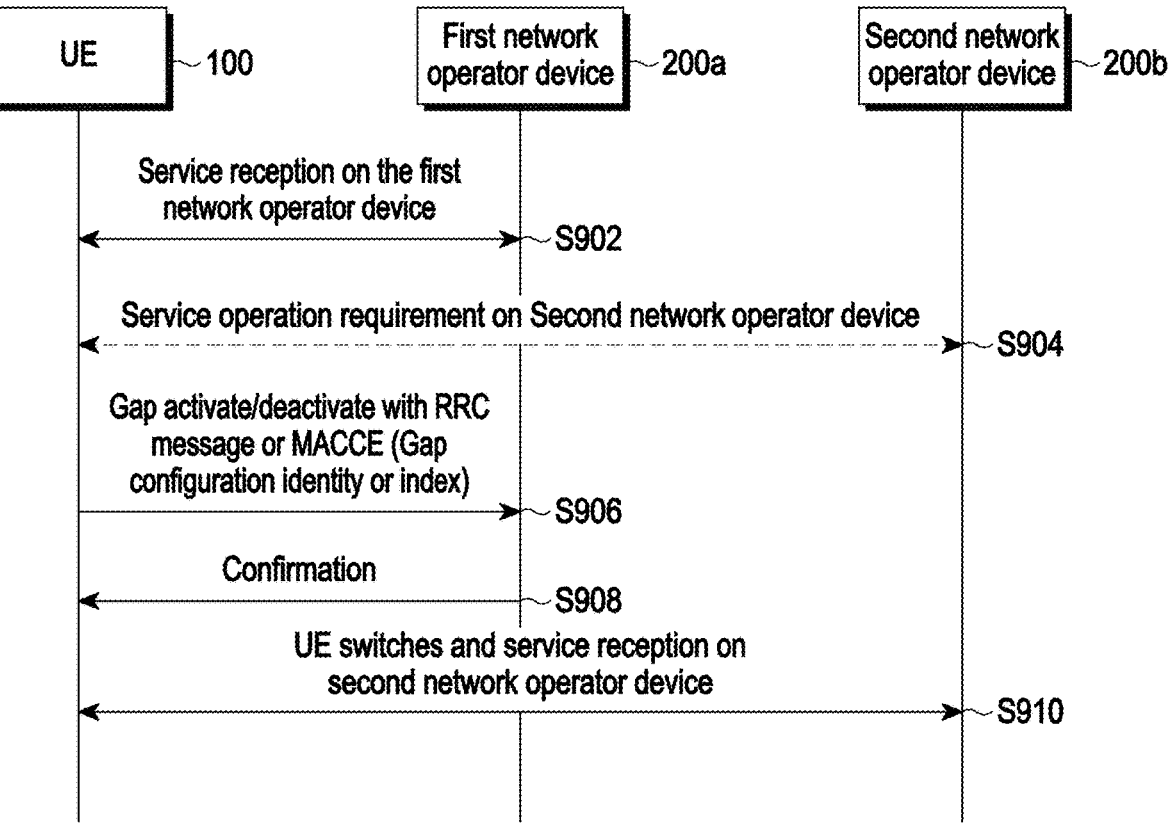
FIG. 9 is a sequence flow diagram illustrating step by step operations for gap scheduling for the UE including the plurality of SIMs in the wireless network based on a gap activate/deactivate with the one of RRC message or MAC CE, according to an embodiment as disclosed herein.

FIG. 9 is a sequence flow diagram illustrating step by step operations for gap scheduling for the UE 100 including the plurality of SIMs 150 in the wireless network 1000 based on the gap activate/deactivate with the RRC message or MAC CE, according to an embodiment as disclosed herein. At S902, the UE 100 gets the service from the first network operator device 200*a*. At S904, the service operation requirement is determined between the UE 100 and the second network operator device 200*b*. At S906, the UE 100 sends the gap activate/deactivate with the RRC message or MAC CE to the first network operator device 200*a*. The RRC message or MAC CE includes the gap configuration identity or index. At S908, the first network operator device 200*a* sends the confirmation message to the UE 100. At S910, the UE 100 switches and service reception on the second network operator device 200*b*.

Figure 10:
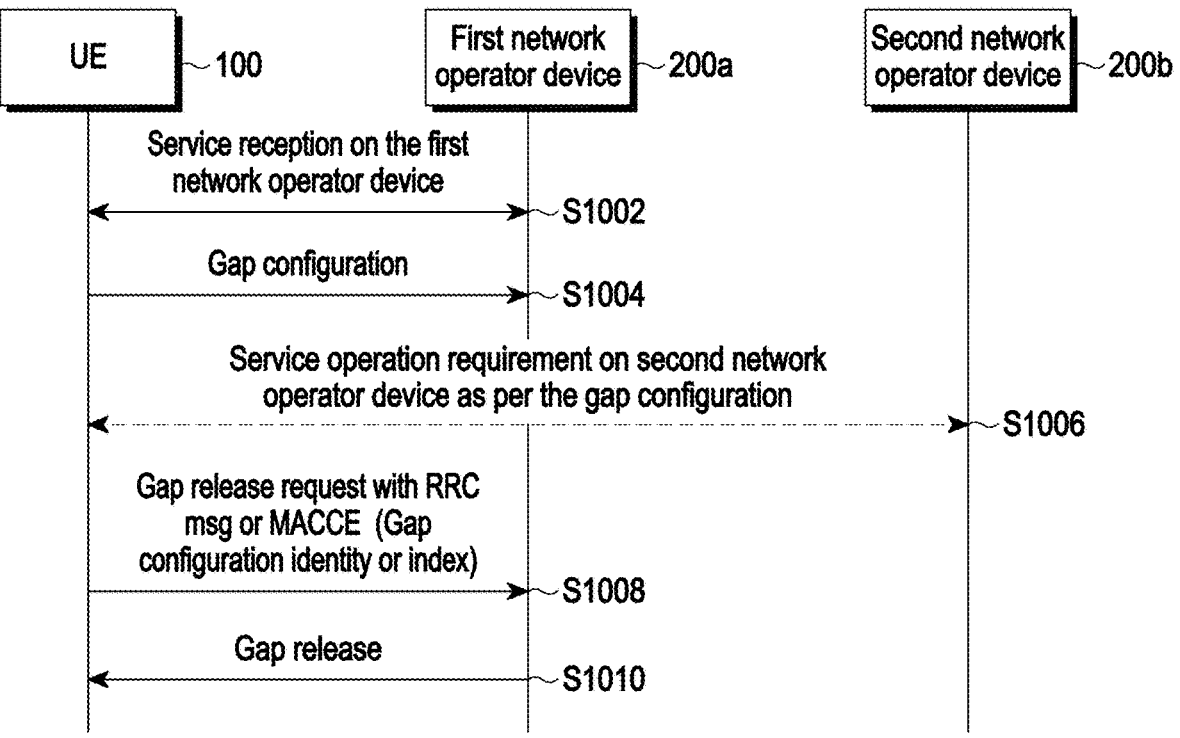
FIG. 10 is a sequence flow diagram illustrating step by step operations for gap scheduling for the UE including the plurality of SIMs in the wireless network based on a gap release request with the one of RRC message or MAC CE, according to an embodiment as disclosed herein.

FIG. 10 is a sequence flow diagram illustrating step by step operations for gap scheduling for the UE 100 including the plurality of SIMs 150 in the wireless network 1000 based on the gap release request with the RRC message or MAC CE, according to an embodiment as disclosed herein. At S1002, the UE 100 gets the service from the first network operator device 200*a*. At S1004, the UE 100 sends the gap configuration to the first network operator device 200*a*. At S1006, the service operation requirement is determined between the UE 100 and the second network operator device 200*b*. At S1008, the UE 100 sends the gap release request with the RRC message or MAC CE to the first network operator device 200*a*. The gap release request includes gap configuration identity or index. At S1010, the first network operator device 200*a* sends the gap release message to the UE 100.

Figure 11:
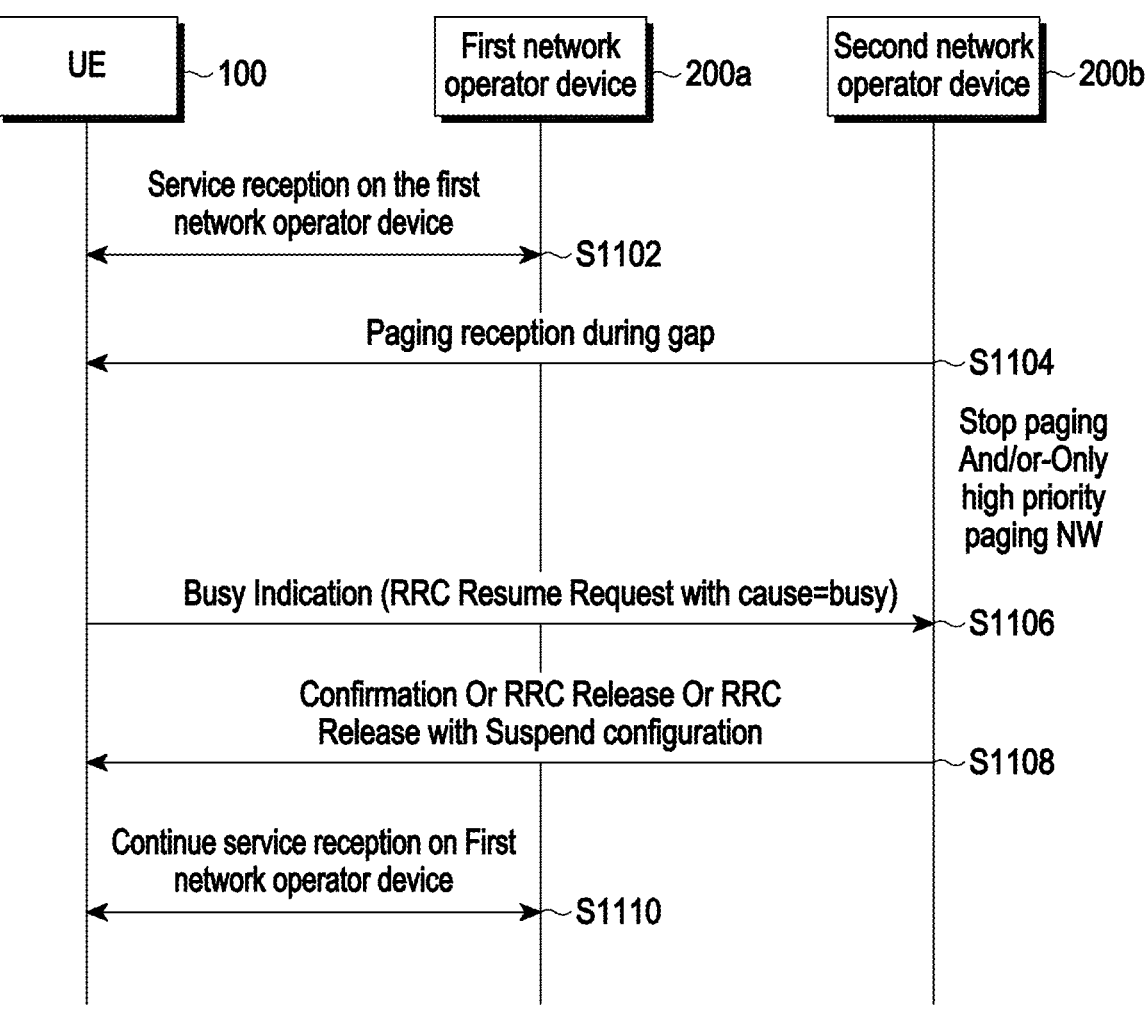
FIG. 11 is a sequence flow diagram illustrating step by step operations for gap scheduling for the UE including the plurality of SIMs in the wireless network based on the RRC resume request with cause value is busy, according to an embodiment as disclosed herein.

FIG. 11 is a sequence flow diagram illustrating step by step operations for gap scheduling for the UE 100 including the plurality of SIMs 150 in the wireless network 1000 based on the RRC Resume request with the cause value is busy, according to an embodiment as disclosed herein. At S1102, the UE 100 gets the service reception from the first network operator device 200*a*. At S1104, the UE 100 receives the paging reception during the gap from the second network operator device 200*b*. At S1106, the UE 100 sends the busy indication with the (RRC resume request with cause=busy) to the second network operator device 200*b*. At S1108, the second network operator device 200*b* sends the confirmation/RRC release/RRC Release with Suspend configuration to the UE 100. At S1110, the UE 100 continues the service reception on the first network operator device 200*a*.

Figure 12:
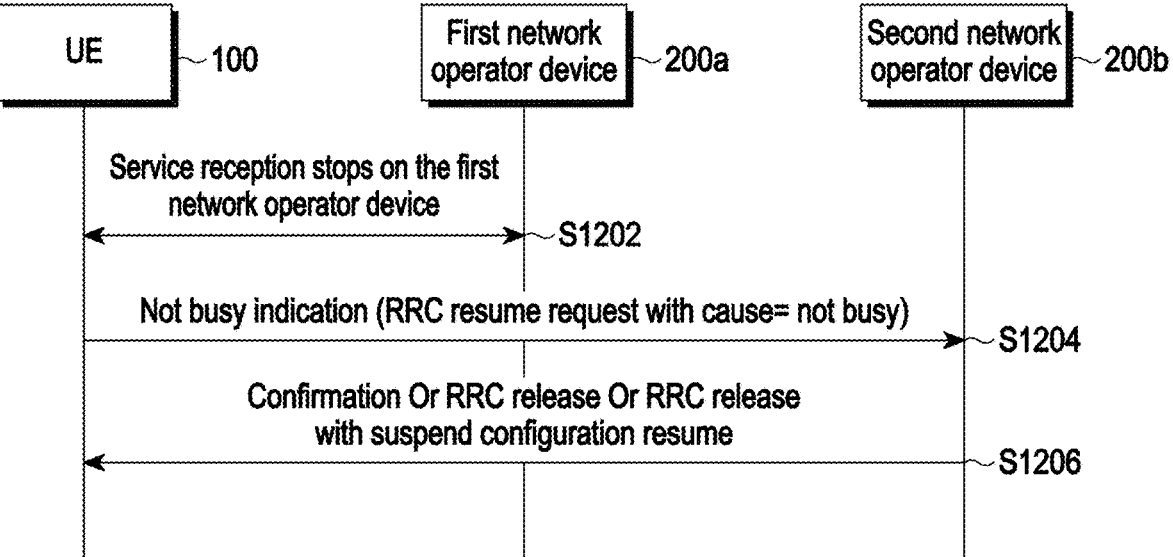
FIG. 12 is a sequence flow diagram illustrating step by step operations for gap scheduling for the UE including the plurality of SIMs in the wireless network based on a sending not busy indication to the second network operator device, according to an embodiment as disclosed herein.

FIG. 12 is a sequence flow diagram illustrating step by step operations for gap scheduling for the UE 100 including the plurality of SIMs 150 in the wireless network 1000 based on the sending not busy indication to the second network operator device 200*b*, according to an embodiment as disclosed herein. At S1202, the UE 100 receives the service reception stop message from the first network operator device 200*a*. At S1204, the UE 100 sends the not busy indication (i.e., RRC resume request with cause=not busy) to the second network operator device 200*b*. At S1206, the second network operator device 200*b* sends the confirmation/RRC release/RRC release with suspend configuration resume to the UE 100. The second network operator device 200*b* resumes the regular paging.

Figure 13:
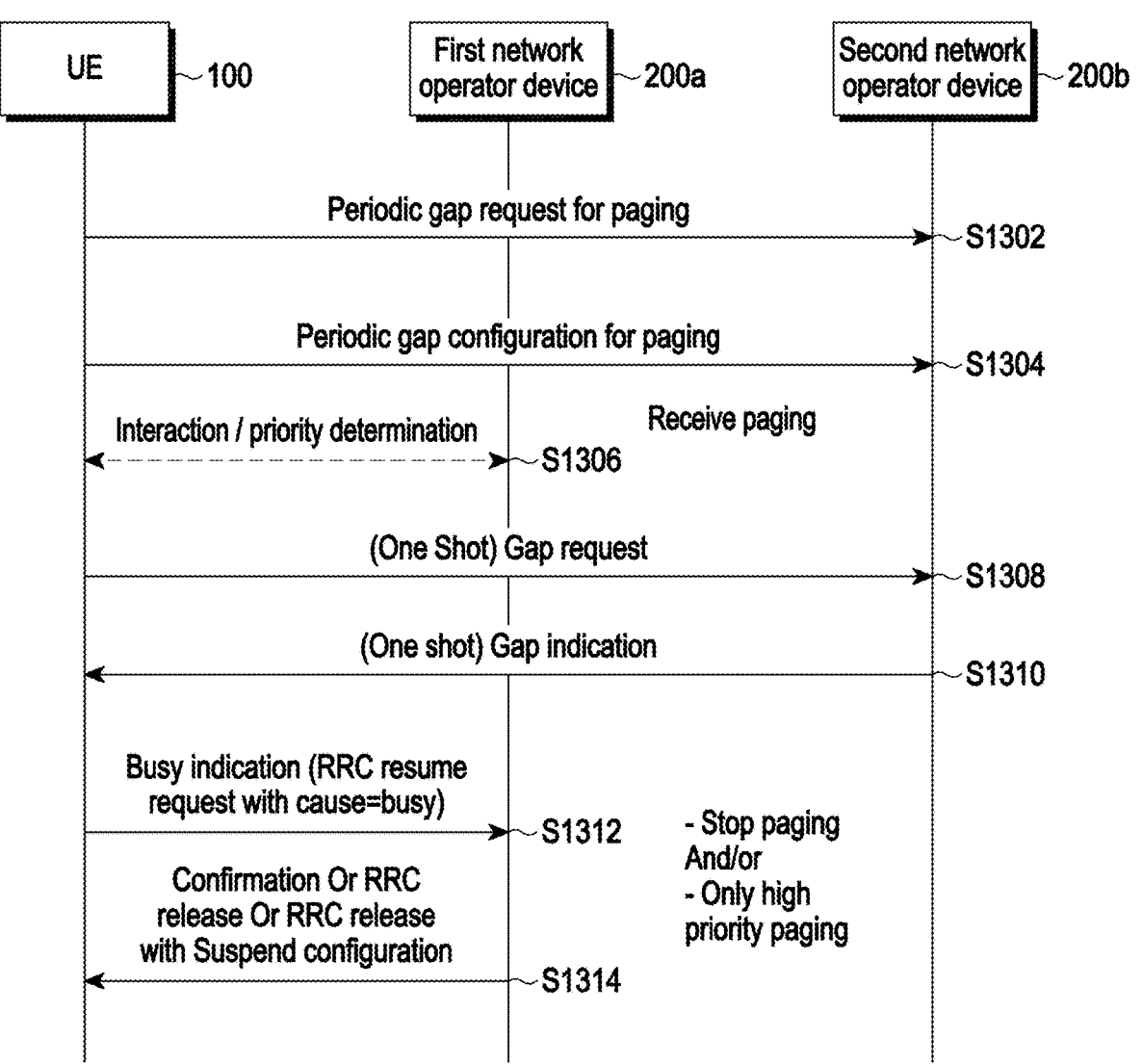
FIG. 13 is a sequence flow diagram illustrating step by step operations for gap scheduling for the UE including the plurality of SIMs in the wireless network based on the sending busy indication to the first network operator device, according to an embodiment as disclosed herein.

FIG. 13 is a sequence flow diagram illustrating step by step operations for gap scheduling for the UE 100 including the plurality of SIMs 150 in the wireless network 1000 based on the sending busy indication to the first network operator device 200*a*, according to an embodiment as disclosed herein.

At S1302, the UE 100 sends the periodic gap request for paging to the second network operator device 200*b*. At S1304, the UE 100 sends the periodic gap configuration for paging to the second network operator device 200*b*. At S1306, the interaction/priority determination is determined between the UE 100 and the first network operator device 200*a*. At S1308, the UE 100 sends the one shot gap request to the second network operator device 200*b*. At S1310, the second network operator device 200*b* sends the one shot gap indication to the UE 100. At S1312, the UE 100 sends the busy indication (i.e., RRC resume request with cause=busy) to the first network operator device 200*a*. At S1314, the first network operator device 200*a* sends the confirmation/RRC release/RRC release with suspend configuration to the UE (100).

FIG. 14 is a flow chart (S1400) illustrating a method for gap scheduling for the UE 100 including the plurality of SIMs 150 in the wireless network 1000, according to an embodiment as disclosed herein. At S1402, the gaps configurations are provided for static or periodic and/or dynamic or aperiodic gaps considering the SMTC occasions to match just before or after gap period. At S1404, the gaps configurations are provided for the static or periodic and/or dynamic or aperiodic gaps considering channel conditions and the UE 100 decoding performance. At S1406, the gaps configurations are provided for the static or periodic and/or dynamic or aperiodic gaps considering QoS, reliability performance, continuity of services. At S1408, the gaps configurations are provided for the static or periodic and/or dynamic or aperiodic gaps considering DRX configuration, paging configuration and measurement configurations.

The various actions, acts, blocks, steps, or the like in the flow charts (S400, S500 and S1400) may be performed in the order presented, in a different order or simultaneously. Further, in some embodiments, some of the actions, acts, blocks, steps, or the like may be omitted, added, modified, skipped, or the like without departing from the scope of the invention.

In an embodiment, an example use of the invention aspects in 3GPP specification can be as follows:

```
1> if transmission of the UEAssistanceInformation message is initiated to
provide MUSIM assistant information for network switching according to 5.7.4.2:
    2> if the UE has preference for network switching without leaving
    RRC_CONNECTED state:
        3> set preferredRRC-StateForSwtiching to connected;
        3> if the UE has preference on setup of MUSIM gaps:
            4> for each MUSIM gap to setup, include an entry
            musim-GapInfo in musim-GapRequestToAddList,
            according to following:
                5> set musim-GapLength to desired MUSIM
                gap length value;
                5> if the requested MUSIM gap is periodic gap:
                    6> include musim-
                    GapRepetitionAndOffset and set it to
                    the desired MUSIM gap repetition
                    pediod value and gap offset value;
                5> if the requested MUSIM gap is aperiodic
                gap:
                    6> include musim-Starting-SFN-
                    AndSubframe and set it to the desired
                    MUSIM gap starting SFN value and
                    subframe number;
        3> if UE has preference on release of configured MUSIM
        gap(s):
            4>for each gap to release, include an entry musim-
            GapIndex-Id in musim-GapRequestToReleaseList,
            according to following:
                5> set musim-GapIndex-Id to the desired
                MUSIM gap index;
    2> if UE has preference for network switching with leaving
    RRC_CONNECTED state:
        3> set preferredRRC-StateForSwtiching to outOfConnected.
MUSIM-Assistance-r17 ::=                      SEQUENCE {
    preferredRRC-StateForSwtiching-r17           ENUMERATED
{ connected, outOfConnected},
    musim-GapRequestToReleaseList-r17               SEQUENCE (SIZE
(1..3)) OF MUSIM-GapIndex-Id-r17 OPTIONAL,    -- Cond connectedPerferred
    musim-GapRequestToAddList-r17                   MUSIM-
GapRequestToAddList-r17                       OPTIONAL, -- Cond
connectedPerferred
    ...
}
MUSIM-GapRequestToAddList-r17 ::= SEQUENCE (Size (1..3)) of MUSIM-
GapInfo-r17

MUSIM-GapInfo-r17 ::=              SEQUENCE {
    musim-Starting-SFN-AndSubframe-r17                      MUSIM-
Starting-SFN-AndSubframe-r17          OPTIONAL, -- Cond aperiodic
    musim-GapLength-r17                     ENUMERATED {FFS],
    musim-GapRepetitionAndOffset-r17          CHOICE {FFS}
OPTIONAL -- Cond periodic
}
MUSIM-GapIndex-Id-r17 ::= INTEGER (0 .. 2)

MUSIM-Starting-SFN-AndSubframe-r17 ::=              SEQUENCE {
    starting-SFN-r17          INTEGER (0 .. 1023),
    startingSubframe-r17          INTEGER (0 .. 9)
}
```

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

According to various embodiments, a method for gap scheduling for a User Equipment (UE) comprising a plurality of Subscriber Identity Modules (SIMs) 150 in a wireless network 1000 may be provided. The method may comprise sending, by the UE 100, a request for at least one gap configuration to a first network operator device 200*a* associated with a first SIM from the plurality of SIMs 150, wherein the UE 100 is in a connected mode with the first SIM and is in an idle mode or an inactive mode with at least one second SIM of the plurality of SIMs 150; receiving, by the UE 100, at least one gap configuration corresponding to at least one gap from the first network operator device 200*a*;

activating, by the UE 100, the at least one gap on the first SIM based on the at least one gap configuration; and switching, by the UE 100, to at least one second network operator device 200*b* associated with the at least one second SIM for service reception on the second SIM during the at least one activated gap on the first SIM.

According to various embodiments, the method may further comprise sending, by the UE 100, a gap release request to the first network operator device 200*a* to release the at least one gap on the first SIM, wherein the gap release request comprises at least one of a gap configuration identity or an index of the at least one configured gap; and receiving, by the UE 100, a gap release response from the first network operator device 200*a* allowing the UE 100 to release the at least one configured gap on the first SIM.

According to various embodiments, the method may further comprise sending, by the UE 100, a gap request to the first network operator device 200*a* to at least one of setup and modify the at least one gap on the first SIM, wherein the gap request comprises at least one of a gap configuration identity or an index of the at least one gap, periodicity, gap-offset or a gap duration of the at least one gap, wherein the gap request is sent by the UE 100 to the first network operator device 200*b* through a radio resource control (RRC) signaling, wherein the RRC signaling comprises a UE assistance information message; and receiving, by the UE 100, a gap configuration from the first network operator device 200*a* allowing the UE 100 to at least one of setup and modify the at least one gap on the first SIM.

According to various embodiments, the UE assistance information message may carry the at least one of gap request or release of the gaps, wherein the UE assistance information message carries at least one of a gap set up or modify for at least one of periodic and aperiodic gaps and release of at least one of periodic and aperiodic gaps.

According to various embodiments, the gap release request may be sent in one of a radio resource control (RRC) signaling comprising a UE assistance information message or a Medium Access Control Control-Element (MAC CE).

According to various embodiments, the method may further comprise sending, by the UE 100, a capability information of the UE 100 to the first network operator device 200*a* indicating that the UE 100 has the capability for switching gaps, wherein the capability information is sent through a RRC signaling comprising a UE assistance information message or a UE capability information message; and receiving, by the UE 100, a response from the first network operator device 200*a* allowing the UE 100 for switching gaps.

According to various embodiments, activating, by the UE 100, the at least one gap on the first SIM based on the at least one gap configuration may comprise sending, by the UE 100, a MAC CE to activate the at least one gap to the first network operator device 200*a*; and receiving, by the UE 100, a gap indication from the first network operator device 200*a* allowing the activation of the at least one gap based on the at least one gap configuration.

According to various embodiments, the MAC CE may comprise at least one of an index of the gap, a duration of the at least one gap and at least one of a gap offset when the at least one gap is periodic, and a gap offset or activation time for the at least one gap when the at least one gap is aperiodic.

According to various embodiments, activating, by the UE 100, the at least one gap on the first SIM based on the at least one gap configuration may comprises sending, by the UE 100, a gap activation request through a RRC signaling comprising a UE assistance information message to activate the at least one gap to the first network operator device 200*a*, wherein the gap activation request comprising index of at least one configured gap; and receiving, by the UE 100, a gap activation response from the first network operator device 200*a* allowing the activation of the at least one gap based on the at least one gap configuration.

According to various embodiments, the request for the at least one gap configuration may comprise at least one of a list of static or periodic gaps and a list of dynamic or aperiodic gaps, the list of static or periodic gaps may have a at least one of periodicity (repetition pattern), a gap-offset indicating a start time of the gap for each period and is mapped to the timings mapped to at least one second network operator device 200*b*, and a duration of the gap, and the list of dynamic or aperiodic gaps may have a gap-offset indicating a start time of the gap.

According to various embodiments, the method may comprise performing, by the UE 100, paging reception on the at least one second network operator device 200*b* during the at least one gap; sending, by the UE 100, a busy or not busy indication to the at least one second network operator device 200*b* based on determination on at least one of activity or activity priority on first network operator device 200*a*; and stopping, by the UE 100, the paging reception on the at least one second network operator device 200*b* in response to sending the busy indication.

According to various embodiments, sending, by the UE 100, a request for the at least one gap configuration to the first network operator device 200*a* associated with the first SIM from the plurality of SIMs 150 may comprise preparing, by the UE 100, the request for the at least one gap configuration based on at least one of a paging configuration, a measurement configuration, System Information Block (SIB) scheduling configuration or a Discontinuous Reception (DRX) configuration of the at least one second SIM; and sending, by the UE 100, the prepared request for the at least one gap configuration to the first network operator device 200*a*.

According to various embodiments, a method for gap scheduling for a User Equipment (UE) 100 comprising a plurality of Subscriber Identity Modules (SIMs) 150 in a wireless network 1000 may be provided. The method may comprise receiving, by a first network operator device 200*a* associated with a first SIM from the plurality of SIMs 150, a request for at least one gap configuration from the UE 100, wherein the UE 100 is in a connected mode with the first SIM and is in an idle mode or an inactive mode with at least one second SIM of the plurality of SIMs 150; determining, by the first network operator device 200*a*, at least one gap configuration based on a plurality of parameters; sending, by the first network operator device 200*a*, at least one gap configuration corresponding to at least one gap to the UE 100; receiving, by the first network operator device 200*a*, a gap activation request to activate the at least one gap from the UE 100; and sending, by the first network operator device 200*a*, a gap activation response to the UE 100 allowing the activation of the at least one gap based on the at least one gap configuration.

According to various embodiments, the gap activation request may be for switching to at least one second network operator device 200*b* associated with the at least one second SIM for service reception on the second SIM during the at least one activated gap on the first SIM.

According to various embodiments, the method may comprise receiving, by the first network operator device 200*a*, a gap release request from the UE 100 to release the at least one gap on the first SIM, wherein the gap release request comprises at least one of a gap configuration identity or an index of the at least one configured gap; and sending, by the first network operator device 200a, a gap release response to the UE 100 allowing the UE 100 to release the at least one configured gap on the first SIM.

According to various embodiments, the method may comprise receiving, by the first network operator device 200a, a gap request from the UE 100 to at least one of setup or modify the at least one gap on the first SIM, wherein the gap request comprises at least one of a gap configuration identity or an index of the at least one gap, periodicity (repetition pattern), gap-offset or a gap duration of the at least one gap, wherein the gap request is sent by the UE 100 to the first network operator device 200b through a radio resource control (RRC) signaling, wherein the RRC signaling comprises a UE assistance information message; and sending, by the first network operator device 200a, a gap configuration to the UE 100 allowing the UE 100 to at least one of setup and modify the at least one gap on the first SIM.

According to various embodiments, the UE assistance information message may carry the at least one of gap request and release of the gaps, wherein the UE assistance information message carries at least one of a gap set up or modify for at least one of periodic and aperiodic gaps and release of at least one of periodic and aperiodic gaps.

According to various embodiments, the gap release request may be received in one of a radio resource control (RRC) signaling comprising UE assistance information message or a Medium Access Control Control-Element (MAC CE).

According to various embodiments, the method may comprise receiving, by the first network operator device 200a, a capability information of the UE 100 from the UE 100 indicating that the UE 100 has the capability for switching gaps, wherein capability information is received through RRC signaling comprising UE assistance information message or a UE capability information message; and sending, by the first network operator device 200a, a response to the UE 100 allowing the UE 100 for switching gaps.

According to various embodiments, the gap activation request may be received with a RRC signaling, wherein gap activation request comprising index of at least one configured gap, and a gap activation response is sent allowing the activation of the at least one gap based on the at least one gap configuration.

According to various embodiments, the request for the at least one gap configuration may comprise at least one of a list of static or periodic gaps and a list of dynamic or aperiodic gaps, wherein the list of static or periodic gaps has at least one of a periodicity (repetition pattern), a gap-offset indicating a start time of the gap for each period and is mapped to the timings mapped to at least one second network operator device, and a duration of the gap, and wherein the list of dynamic or aperiodic gaps has at least one of a gap-offset.

According to various embodiments, the plurality of parameters may comprise at least one of SSB based measurement timing configuration (SMTC) occasions for a serving cell, a Synchronization Signal block (SSB), paging configuration, SIB scheduling configuration, Channel Status Information Reference Signal (CSIRS) configurations for the serving cell, a Reference Signal Received Power (RSRP), a Reference Signal Strength Indicator (RSSI), a Reference Signal Received Quality (RSRQ), a Signal to Interference Noise Ratio (SINR), a Block Error Rate/Packet Error Rate (BLER/PER), a Channel Quality Indicator (CQI), a Quality of Service (QoS), a reliability performance of service, or a continuity of service on the at least one second SIM.

According to various embodiments, a User Equipment (UE) 100 for gap scheduling in a wireless network 1000 may be provided. The UE 100 may comprise a memory 130 comprising a plurality of Subscriber Identity Modules (SIMs) 150; a processor 110; and a gap scheduling controller 140, connected to the memory 130 and the processor 110, and configured to: send a request for at least one gap configuration to a first network operator device 200a associated with a first SIM from the plurality of SIMs 150, wherein the UE 100 is in a connected mode with the first SIM and is in an idle mode or an inactive mode with at least one second SIM of the plurality of SIMs 150; receive at least one gap configuration corresponding to at least one gap from the first network operator device 200a; activate the at least one gap on the first SIM based on the at least one gap configuration; and switch to at least one second network operator device 200b associated with the at least one second SIM for service reception on the second SIM during the at least one activated gap on the first SIM.

According to various embodiments, the gap scheduling controller 140 may be configured to: send a gap release request to the first network operator device 200a to release the at least one gap on the first SIM, wherein the gap release request comprises a gap configuration identity or an index of the at least one configured gap; and receive a gap release response from the first network operator device 200a allowing the UE 100 to release the at least one configured gap on the first SIM.

According to various embodiments, the gap scheduling controller 140 may be configured to: send a gap request to the first network operator device 200a to at least one of setup or modify the at least one gap on the first SIM, wherein the gap request comprises at least one of a gap configuration identity or an index of the at least one gap, periodicity (repetition pattern), a gap-offset or a gap duration of the at least one gap, wherein the gap request is sent by the UE 100 to the first network operator device 200b through a radio resource control (RRC) signaling, wherein the RRC signaling comprises a UE assistance information message; and receive a gap configuration from the first network operator device 200a allowing the UE 100 to at least one of setup or modify the at least one gap on the first SIM.

According to various embodiments, the UE assistance information message may carry the at least one of gap request and release of the gaps, wherein the UE assistance information message carries at least one of a gap set up and modify for at least one of periodic and/or aperiodic gaps and release of at least one of periodic and/or aperiodic gaps.

According to various embodiments, the gap release request may be sent in one of a radio resource control (RRC) signaling comprising UE assistance information message or a Medium Access Control Control-Element (MAC CE).

According to various embodiments, the gap scheduling controller 140 may be configured to: send a capability information of the UE 100 to the first network operator device 200a indicating that the UE 100 has the capability for switching gaps, wherein capability information is sent through a RRC signaling comprising UE assistance information message or UE capability information message; and receive a response from the first network operator device 200a allowing the UE 100 for switching gaps.

According to various embodiments, activating the at least one gap on the first SIM based on the at least one gap configuration may comprise sending a MAC CE to activate the at least one gap to the first network operator device 200*a*; and receiving a gap indication from the first network operator device 200*a* allowing the activation of the at least one gap based on the at least one gap configuration.

According to various embodiments, the RRC signaling message or the MAC CE may comprise an index of the gap and at least one of when the at least one gap is periodic a gap offset, and when the at least one gap is dynamic or aperiodic, a gap offset or activation time for the at least one gap, a duration of the at least one gap.

According to various embodiments, activating the at least one gap on the first SIM based on the at least one gap configuration may comprise sending a gap activation request to activate the at least one gap to the first network operator device 200*a* through a RRC signaling message; and receiving a gap activation response from the first network operator device 200*a* allowing the activation of the at least one gap based on the at least one gap configuration.

According to various embodiments, the request for the at least one gap configuration may comprise at least one of a list of static or periodic gaps and a list of dynamic or aperiodic gaps, the list of static or periodic gaps may have a known periodicity (repetition pattern), a gap-offset indicating a start time of the gap for each period and is mapped to the timings mapped to at least one second network operator device 200*b*, and a duration of the gap, and the list of dynamic or aperiodic gaps has a gap-offset indicating a start time of the gap (starting System Frame Number (SFN) and sub-frame may be mapped to the timings mapped to at least one second network operator device) and a duration of the gap is known or not known a priory.

According to various embodiments, the gap scheduling controller 140 may be configured to: perform paging reception on the at least one second network operator device 200*b* during the at least one gap; send a busy or not busy indication to the at least one second network operator device 200*b*; and stop the paging reception on the at least one second network operator device 200*b* in response to sending the busy indication.

According to various embodiments, sending a request for the at least one gap configuration to the first network operator device 200*a* associated with the first SIM from the plurality of SIMs 150 may comprise preparing the request for the at least one gap configuration based on at least one of a paging configuration, a measurement configuration, System Information Block (SIB) scheduling configuration and a Discontinuous Reception (DRX) configuration of the at least on second SIM; and sending the prepared request for the at least one gap configuration to the first network operator device 200*a*.

According to various embodiments, a first network operator device 200*a* for gap scheduling for User Equipment (UE) 100 comprising a plurality of Subscriber Identity Modules (SIMs) 150 in a wireless network 1000 may be provided. The first network operator device 200*a* may comprise a memory 230; a processor 210; and a gap scheduling controller 240, connected to the memory 230 and the processor 210, and configured to: receive a request for at least one gap configuration from the UE 100, wherein the first network operator device 200*a* is associated with a first SIM from the plurality of SIMs 150 of the UE 100, wherein the UE 100 is in a connected mode with the first SIM and is in an idle or inactive mode with at least one second SIM of the plurality of SIMs 150; determine at least one gap configuration based on a plurality of parameters; send at least one gap configuration corresponding to at least one gap to the UE 100;

receive a gap activation request to activate the at least one gap from the UE 100 for switching to at least one second network operator device 200*b* associated with the at least one second SIM for service reception on the second SIM during the at least one activated gap on the first SIM; and send a gap activation response to the UE 100 allowing the activation of the at least one gap based on the at least one gap configuration.

According to various embodiments, the gap scheduling controller 240 may be configured to: receive a gap release request from the UE 100 to release the at least one gap on the first SIM, wherein the gap release request comprises a gap configuration identity or an index of the at least one configured gap; and send a gap release response to the UE 100 allowing the UE 100 to release the at least one configured gap on the first SIM.

According to various embodiments, wherein the gap scheduling controller 240 may be configured to: receive a gap request from the UE 100 to at least one of setup and modify the at least one gap on the first SIM, wherein the gap request comprises at least one of a gap configuration identity or an index of the at least one gap, periodicity (repetition pattern), a gap-offset or a gap duration of the at least one gap, wherein the gap request is sent by the UE 100 to the first network operator device 200*b* through a radio resource control (RRC) signaling, wherein the RRC signaling comprises a UE assistance information message; and send a gap configuration to the UE 100 allowing the UE 100 to at least one of setup and modify the at least one gap on the first SIM.

According to various embodiments, the UE assistance information message may carry the at least one of gap request or release of the gaps, wherein the UE assistance information message carries at least one of a gap set up and modify for at least one of periodic and aperiodic gaps and release of at least one of periodic and aperiodic gaps.

According to various embodiments, the gap release request is received in one of a radio resource control (RRC) signaling may comprise a UE assistance information message or a Medium Access Control Control-Element (MAC CE).

According to various embodiments, the gap scheduling controller 240 may be configured to: receive a capability information of the UE 100 from the UE 100 indicating that the UE 100 has the capability for switching gap; and send a response to the UE 100 allowing the UE 100 for switching gaps.

According to various embodiments, the gap activation request may be received in one of a RRC signaling message or a MAC CE message, and the message may comprise an index of the gap and at least one of when the at least one gap is periodic a gap offset, and when the at least one gap is dynamic or aperiodic, a gap offset or activation time for the at least one gap, a duration of the at least one gap.

According to various embodiments, the request for the at least one gap configuration may comprise at least one of a list of static or periodic gaps and a list of dynamic or aperiodic gaps, the list of static or periodic gaps may have at least one of a periodicity, a gap-offset indicating a start time of the gap for each period and is mapped to the timings mapped to at least one second network operator device, and a duration of the gap, and the list of dynamic or aperiodic gaps may have at least one of a gap-offset indicating a start time of the gap (starting System Frame Number (SFN) and sub-frame is mapped to the timings mapped to at least one second network operator device) and a duration of the gap is known or not known a priory.

According to various embodiments, the plurality of parameters may comprise at least one of SSB based measurement timing configuration (SMTC) SMTC occasions for a serving cell, a Synchronization Signal block (SSB), paging configuration, SIB scheduling configuration Channel State Information Reference Signal (CSIRS) configurations for the serving cell, a Reference Signal Received Power (RSRP), a Reference Signal Strength Indicator (RSSI), Reference Signal Received Quality (RSRQ), a Signal to Interference Noise Ratio (SINR), a Block Error Rate/Packet Error Rate (BLER/PER), a Channel Quality Indicator (CQI), a Quality of Service (QoS), a reliability performance of service, and a continuity of service on the at least one second SIM.

The invention claimed is:

1. A method for communication by a user equipment (UE) including a plurality of subscriber identity modules (SIMs) in a wireless communication system, the method comprising:

transmitting, to a first network, a first message including information related to one or more gaps related to a multi-SIM operation; and receiving, from the first network, a second message including information related to at least one gap related to the multi-SIM operation, wherein in case that the UE has a preference to leave a radio resource control (RRC) connected state in the first network while temporarily switching from the first network to a second network, the first message further includes information related to a preferred RRC state in the first network while temporarily switching from the first network to the second network, and the information related to the preferred RRC state indicates one of a plurality of states comprising an idle state, an inactive state, and an outOfConnected state, and wherein in case that the one or more gaps include one or more aperiodic gaps, the first message further includes information indicating a length of the one or more gaps and information indicating a starting system frame number (SFN) and a subframe of the one or more gaps.

2. The method of claim 1, further comprising, after transmitting the first message including the information related to the preferred RRC state in the first network while temporarily switching from the first network to the second network, switching from the first network to the second network.

3. The method of claim 1, wherein in case that the UE has a preference to be kept in the RRC connected state in the first network while temporarily switching from the first network to a second network, the first message further includes the information related to the preferred RRC state indicating the RRC connected state.

4. The method of claim 1, wherein in case that the one or more gaps include one or more periodic gaps, the first message further includes information indicating a length, a gap repetition period, and a gap offset of the one or more gaps.

5. A method for communication by a device of a first network in a wireless communication system, the method comprising:

receiving, from a user equipment (UE) including a plurality of subscriber identity modules (SIMs), a first message including information related to one or more gaps related to a multi-SIM operation; and transmitting, to the UE, a second message including information related to at least one gap related to the multi-SIM operation, wherein in case that the UE has a preference to leave a radio resource control (RRC) connected state in the first network while temporarily switching from the first network to a second network, the first message further includes information related to a preferred RRC state in the first network while temporarily switching from the first network to the second network, and the information related to the preferred RRC state indicates one of a plurality of states comprising an idle state, an inactive state, and an outOfConnected state, and wherein in case that the one or more gaps include one or more aperiodic gaps, the first message further includes information indicating a length of the one or more gaps and information indicating a starting system frame number (SEN) and a subframe of the one or more gaps.

6. The method of claim 5, further comprising releasing the UE to one of the RRC inactive state or the RRC idle state.

7. The method of claim 5, wherein in case that the UE has a preference to be kept in the RRC connected state in the first network while temporarily switching from the first network to a second network, the first message further includes the information related to the preferred RRC state indicating the RRC connected state.

8. The method of claim 5, wherein in case that the one or more gaps include one or more periodic gaps, the first message further includes information indicating a length, a gap repetition period, and a gap offset of the one or more gaps.

9. A user equipment (UE) including a plurality of subscriber identity modules (SIMs) in a wireless communication system, the UE comprising:

a communicator; and a processor connected to the communicator, wherein the processor is configured to:

transmit, to a first network, a first message including information related to one or more gaps related to a multi-SIM operation, and receive, from the first network, a second message including information related to at least one gap related to the multi-SIM operation, wherein in case that the UE has a preference to leave a radio resource control (RRC) connected state in the first network while temporarily switching from the first network to a second network, the first message further includes information related to a preferred RRC state in the first network while temporarily switching from the first network to the second network, the information related to the preferred RRC state indicates one of a plurality of states comprising an idle state, an inactive state, and an outOfConnected state, and wherein in case that the one or more gaps include one or more aperiodic gaps, the first message further includes information indicating a length of the one or more gaps and information indicating a starting system frame number (SFN) and a subframe of the one or more gaps.

10. The UE of claim 9, wherein in case that the one or more gaps include one or more periodic gaps, the first message further includes information indicating a length, a gap repetition period, and a gap offset of the one or more gaps.

11. The UE of claim 9, wherein in case that the one or more gaps include one or more aperiodic gaps, the first message further includes information indicating a length and a start time of the one or more gaps.

12. A device of a first network in a wireless communication system, the device comprising:

a communicator; and a processor connected to the communicator, wherein the processor is configured to:

receive, from a user equipment (UE) including a plurality of subscriber identity modules (SIMs), a first message including information related to one or more gaps related to a multi-SIM operation, and transmit, to the UE, a second message including information related to at least one gap related to the multi-SIM operation, wherein in case that the UE has a preference to leave a radio resource control (RRC) connected state in the first network while temporarily switching from the first network to a second network, the first message further includes information related to a preferred RRC state in the first network while temporarily switching from the first network to the second network, and the information related to the preferred RRC state indicates one of a plurality of states comprising an idle state, an inactive state, and an outOfConnected state, and wherein in case that the one or more gaps include one or more aperiodic gaps, the first message further includes information indicating a length of the one or more gaps and information indicating a starting system frame number (SFN) and a subframe of the one or more gaps.

13. The device of claim 12, wherein in case that the one or more gaps include one or more periodic gaps, the first message further includes information indicating a length, a gap repetition period, and a gap offset of the one or more gaps.

* * * * *